(12) United States Patent
Solum et al.

(10) Patent No.: US 11,019,589 B2
(45) Date of Patent: *May 25, 2021

(54) LOW POWER INTERMITTENT MESSAGING FOR HEARING ASSISTANCE DEVICES

(71) Applicant: Starkey Laboratories, Inc., Eden Prairie, MN (US)

(72) Inventors: Jeffrey Paul Solum, Greenwood, MN (US); Randall A. Kroenke, Shakopee, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/277,874

(22) Filed: Feb. 15, 2019

(65) Prior Publication Data
US 2019/0191402 A1    Jun. 20, 2019

Related U.S. Application Data

(63) Continuation of application No. 15/236,978, filed on Aug. 15, 2016, now Pat. No. 10,212,682, which is a
(Continued)

(51) Int. Cl.
*H04W 56/00* (2009.01)
*H04R 25/00* (2006.01)
*H04L 7/00* (2006.01)

(52) U.S. Cl.
CPC ....... *H04W 56/0035* (2013.01); *H04L 7/0008* (2013.01); *H04R 25/55* (2013.01);
(Continued)

(58) Field of Classification Search
CPC . H04W 56/0035; H04R 25/554; H04R 25/55; H04R 2225/55; H04L 7/0008;
(Continued)

(56) References Cited

U.S. PATENT DOCUMENTS 2,530,621 A    11/1950    Lybarger
2,554,834 A    5/1951    Lavery
(Continued)

FOREIGN PATENT DOCUMENTS

CH    670349 A5    5/1989
CH    6735515 A5    3/1990
(Continued)

OTHER PUBLICATIONS

"3D Circuits -A- Laser", [Online]. Retrieved from the Internet: <http://ww.a-laser.com3dcircuits.html>, (2012).
(Continued)

*Primary Examiner* — Oyesola C Ojo
(74) *Attorney, Agent, or Firm* — Schwegman Lundberg & Woessner, P.A.

(57) ABSTRACT

The present subject matter includes a system for communications between a transmitter and a receiver. In various embodiments, the system uses a sleep interval to allow the receiver to go to sleep between wake up times to "sniff" for transmissions from the transmitter. The system adjusts the length of the preamble of the transmitted signal or a repetition of packets to allow the receiver to detect a transmitted signal based on drift in the clocks of the system. In various embodiments, a receive channel is changed if a signal is not received at a prior channel selection. In various embodiments, the transmission is determined by detection of an event. In various embodiments, the event is an ear-to-ear event. In various embodiments, the receiver and transmitter are in opposite hearing aids adapted to be worn by one wearer.

20 Claims, 6 Drawing Sheets

Related U.S. Application Data continuation of application No. 12/830,892, filed on Jul. 6, 2010, now Pat. No. 9,420,385, which is a continuation-in-part of application No. 12/643,540, filed on Dec. 21, 2009, now Pat. No. 9,426,586.

(52) U.S. Cl.
CPC ....... *H04R 25/554* (2013.01); *H04R 2225/55* (2013.01); *Y02D 30/70* (2020.08)

(58) Field of Classification Search
CPC .... Y02D 70/00; Y02D 70/146; Y02D 70/162; Y02D 70/144; Y02D 70/142; Y02D 70/166
See application file for complete search history.

(56) References Cited

U.S. PATENT DOCUMENTS

| | | | |
|---|---|---|---|
| 2,656,421 A | 10/1953 | Lybarger |
| 3,396,245 A | 8/1968 | Flygstad |
| 3,660,695 A | 5/1972 | Schmitt |
| 3,742,359 A | 6/1973 | Behymer |
| 3,894,196 A | 7/1975 | Briskey |
| 4,187,413 A | 2/1980 | Moser |
| 4,395,601 A | 7/1983 | Kopke et al. |
| 4,425,481 A | 1/1984 | Mansgold et al. |
| 4,467,145 A | 8/1984 | Borstel |
| 4,489,330 A | 12/1984 | Marutake et al. |
| 4,490,585 A | 12/1984 | Tanaka |
| 4,508,940 A | 4/1985 | Steeger |
| 4,596,899 A | 6/1986 | Wojcik et al. |
| 4,631,419 A | 12/1986 | Sadamatsu et al. |
| 4,638,125 A | 1/1987 | Buettner |
| 4,694,472 A * | 9/1987 | Torok ................ H04J 3/0664 327/141 |
| 4,696,032 A | 9/1987 | Levy |
| 4,710,961 A | 12/1987 | Buttner |
| 4,756,312 A | 7/1988 | Epley |
| 4,764,957 A | 8/1988 | Angelini et al. |
| 4,845,755 A | 7/1989 | Busch et al. |
| 4,862,509 A | 8/1989 | Towsend |
| 4,887,299 A | 12/1989 | Cummins et al. |
| 4,926,464 A | 5/1990 | Schley-May |
| 4,930,156 A | 5/1990 | Norris |
| 4,995,085 A | 2/1991 | Kern et al. |
| 5,010,575 A | 4/1991 | Marutake et al. |
| 5,027,410 A | 6/1991 | Williamson et al. |
| 5,083,312 A | 1/1992 | Newton et al. |
| 5,086,464 A | 2/1992 | Groppe |
| 5,091,952 A | 2/1992 | Williamson et al. |
| 5,157,405 A | 10/1992 | Wycoff et al. |
| 5,189,704 A | 2/1993 | Krauss |
| 5,204,917 A | 4/1993 | Arndt et al. |
| 5,212,827 A | 5/1993 | Meszko et al. |
| 5,280,524 A | 1/1994 | Norris |
| 5,404,407 A | 4/1995 | Weiss |
| 5,422,628 A | 6/1995 | Rodgers |
| 5,425,104 A | 6/1995 | Shennib |
| 5,426,689 A | 6/1995 | Griffith et al. |
| 5,434,924 A | 7/1995 | Jampolsky |
| 5,463,692 A | 10/1995 | Fackler |
| 5,479,522 A | 12/1995 | Lindemann et al. |
| 5,524,056 A | 6/1996 | Killion et al. |
| 5,553,152 A | 9/1996 | Newton |
| 5,600,728 A | 2/1997 | Satre |
| 5,629,985 A | 5/1997 | Thompson |
| 5,636,285 A | 6/1997 | Sauer |
| 5,640,293 A | 6/1997 | Dawes et al. |
| 5,640,457 A | 6/1997 | Gnecco et al. |
| 5,651,071 A | 7/1997 | Lindemann et al. |
| 5,659,621 A | 8/1997 | Newton |
| 5,687,242 A | 11/1997 | Iburg |
| 5,706,351 A | 1/1998 | Weinfurtner |
| 5,710,820 A | 1/1998 | Martin et al. |
| 5,721,783 A | 2/1998 | Anderson |
| 5,734,976 A | 3/1998 | Bartschi et al. |
| 5,737,430 A | 4/1998 | Widrow |
| 5,740,257 A | 4/1998 | Marcus |
| 5,751,820 A | 5/1998 | Taenzer |
| 5,757,932 A | 5/1998 | Lindemann et al. |
| 5,757,933 A | 5/1998 | Preves et al. |
| 5,761,319 A | 6/1998 | Dar et al. |
| 5,768,397 A | 6/1998 | Fazio |
| 5,793,875 A | 8/1998 | Lehr et al. |
| 5,796,848 A | 8/1998 | Martin |
| 5,809,151 A | 9/1998 | Husung |
| 5,823,610 A | 10/1998 | Ryan et al. |
| 5,835,610 A | 11/1998 | Ishige et al. |
| 5,956,330 A | 9/1999 | Kerns |
| 5,966,639 A | 10/1999 | Goldberg et al. |
| 5,991,419 A | 11/1999 | Brander |
| 5,991,420 A | 11/1999 | Stern |
| 6,021,207 A | 2/2000 | Puthuff et al. |
| 6,031,922 A | 2/2000 | Tibbetts |
| 6,031,923 A | 2/2000 | Gnecco et al. |
| 6,067,445 A | 5/2000 | Gray et al. |
| 6,078,675 A | 6/2000 | Bowen-Nielsen et al. |
| 6,078,825 A | 6/2000 | Hahn et al. |
| 6,088,339 A | 7/2000 | Meyer |
| 6,101,258 A | 8/2000 | Killion et al. |
| 6,104,821 A | 8/2000 | Husung |
| 6,115,478 A | 9/2000 | Schneider |
| 6,118,877 A | 9/2000 | Lindemann et al. |
| 6,144,748 A | 11/2000 | Kerns |
| 6,148,087 A | 11/2000 | Martin |
| 6,157,727 A | 12/2000 | Rueda |
| 6,157,728 A | 12/2000 | Tong et al. |
| 6,175,633 B1 | 1/2001 | Morrill et al. |
| 6,216,040 B1 | 4/2001 | Harrison |
| 6,230,029 B1 | 5/2001 | Hahn et al. |
| 6,240,194 B1 * | 5/2001 | De Koning .......... H04R 25/558 381/312 |
| 6,310,556 B1 | 10/2001 | Green et al. |
| 6,311,155 B1 | 10/2001 | Vaudrey et al. |
| 6,324,291 B1 | 11/2001 | Weidner |
| 6,327,370 B1 | 12/2001 | Killion et al. |
| 6,356,538 B1 | 3/2002 | Li |
| 6,356,741 B1 | 3/2002 | Bilotti et al. |
| 6,381,308 B1 | 4/2002 | Cargo et al. |
| 6,438,245 B1 | 8/2002 | Taenzer et al. |
| 6,459,882 B1 | 10/2002 | Palermo et al. |
| 6,466,679 B1 | 10/2002 | Husung |
| 6,522,764 B1 | 2/2003 | Bogeskov-Jensen |
| 6,532,295 B1 * | 3/2003 | Brimhall ............. H04R 25/656 381/328 |
| 6,549,633 B1 | 4/2003 | Westermann |
| 6,633,645 B2 | 10/2003 | Bren et al. |
| 6,694,034 B2 | 2/2004 | Julstrom et al. |
| 6,760,457 B1 | 7/2004 | Bren et al. |
| 7,016,511 B1 | 3/2006 | Shennib |
| 7,020,501 B1 * | 3/2006 | Elliott ............... H04W 52/0216 455/574 |
| 7,062,223 B2 | 6/2006 | Gerber et al. |
| 7,062,687 B1 | 6/2006 | Gfeller et al. |
| 7,075,903 B1 | 7/2006 | Solum |
| 7,099,486 B2 | 8/2006 | Julstrom et al. |
| 7,139,404 B2 | 11/2006 | Feeley et al. |
| 7,142,814 B2 | 11/2006 | Nassimi |
| 7,149,552 B2 | 12/2006 | Lair |
| 7,162,381 B2 | 1/2007 | Boor et al. |
| 7,181,032 B2 | 2/2007 | Jakob et al. |
| 7,191,354 B2 * | 3/2007 | Purho ..................... G06F 1/14 713/400 |
| 7,248,713 B2 | 7/2007 | Bren et al. |
| 7,257,372 B2 | 8/2007 | Kaltenbach et al. |
| 7,260,233 B2 | 8/2007 | Svendsen et al. |
| 7,272,738 B2 * | 9/2007 | Ishikawa ............ G06F 13/423 709/208 |
| 7,317,997 B2 | 1/2008 | Boor et al. |
| 7,369,669 B2 | 5/2008 | Hagen et al. |
| 7,386,026 B1 * | 6/2008 | Gold ................... H04B 1/7143 375/130 |
| 7,412,294 B1 | 8/2008 | Woolfork |

(56) References Cited

U.S. PATENT DOCUMENTS

| | | | |
|---|---|---|---|
| 7,433,435 B2* | 10/2008 | Nagaraja | H04L 27/2662 375/354 |
| 7,447,325 B2 | 11/2008 | Bren et al. | |
| 7,450,078 B2 | 11/2008 | Knudsen et al. | |
| 7,463,910 B2* | 12/2008 | Wang | H04W 52/029 455/574 |
| 7,512,423 B2 | 3/2009 | Karaoguz | |
| 7,519,194 B2 | 4/2009 | Niederdrank et al. | |
| 7,529,565 B2 | 5/2009 | Hilpisch et al. | |
| 7,561,707 B2 | 7/2009 | Kornagel | |
| 7,596,237 B1 | 9/2009 | Constantin | |
| 7,702,121 B2 | 4/2010 | Husung et al. | |
| 7,778,432 B2 | 8/2010 | Larsen | |
| 7,791,551 B2 | 9/2010 | Platz | |
| 7,813,762 B2 | 10/2010 | Sanguino et al. | |
| 7,907,555 B1 | 3/2011 | Sankabathula et al. | |
| 7,979,096 B1 | 7/2011 | Elliott et al. | |
| 8,041,062 B2 | 10/2011 | Cohen et al. | |
| 8,041,066 B2 | 10/2011 | Solum | |
| 8,169,938 B2 | 5/2012 | Duchscher et al. | |
| 8,194,901 B2 | 6/2012 | Alber et al. | |
| 8,224,004 B2 | 7/2012 | Baechler et al. | |
| 8,229,146 B2 | 7/2012 | Nielsen | |
| 8,254,608 B2 | 8/2012 | De Finis | |
| 8,280,086 B2 | 10/2012 | Topholm | |
| 8,331,592 B2 | 12/2012 | Wu et al. | |
| 8,340,331 B2 | 12/2012 | Pansell et al. | |
| 8,380,320 B2 | 2/2013 | Spital | |
| 8,442,248 B2 | 5/2013 | Solum et al. | |
| 8,515,114 B2 | 8/2013 | Solum | |
| 8,548,180 B2 | 10/2013 | Takagi et al. | |
| 8,559,663 B1 | 10/2013 | Sacha et al. | |
| 8,700,105 B2 | 4/2014 | Lee et al. | |
| 8,712,083 B2 | 4/2014 | Solum | |
| 8,804,988 B2 | 8/2014 | Solum et al. | |
| 8,811,639 B2 | 8/2014 | Solum et al. | |
| 8,891,793 B1 | 11/2014 | Sacha et al. | |
| 8,983,402 B2 | 3/2015 | Wang et al. | |
| 9,402,142 B2 | 7/2016 | Solum et al. | |
| 9,420,385 B2 | 8/2016 | Solum et al. | |
| 9,420,387 B2 | 8/2016 | Solum et al. | |
| 9,426,586 B2 | 8/2016 | Solum et al. | |
| 9,439,006 B2 | 9/2016 | Sacha et al. | |
| 9,635,470 B2 | 4/2017 | Solum | |
| 9,774,961 B2 | 9/2017 | Solum et al. | |
| 10,212,682 B2 | 2/2019 | Solum et al. | |
| 2001/0007335 A1 | 7/2001 | Tuttle et al. | |
| 2002/0006206 A1 | 1/2002 | Scofield | |
| 2002/0030871 A1 | 3/2002 | Anderson et al. | |
| 2002/0076073 A1 | 6/2002 | Taenzer et al. | |
| 2002/0090099 A1 | 7/2002 | Hwang | |
| 2002/0131614 A1 | 9/2002 | Jakob et al. | |
| 2002/0132585 A1 | 9/2002 | Palermo et al. | |
| 2002/0146985 A1* | 10/2002 | Naden | H04W 52/0248 455/70 |
| 2002/0174340 A1 | 11/2002 | Dick et al. | |
| 2002/0186857 A1 | 12/2002 | Bren et al. | |
| 2003/0045283 A1 | 3/2003 | Hagedoorn | |
| 2003/0059073 A1 | 3/2003 | Bren et al. | |
| 2003/0059076 A1 | 3/2003 | Martin | |
| 2003/0076974 A1 | 4/2003 | Barthel et al. | |
| 2003/0078071 A1 | 4/2003 | Uchiyama | |
| 2003/0112862 A1 | 6/2003 | Joe et al. | |
| 2003/0133582 A1 | 7/2003 | Niederdrank | |
| 2003/0149526 A1 | 8/2003 | Zhou et al. | |
| 2003/0215106 A1 | 11/2003 | Hagen et al. | |
| 2003/0231783 A1 | 12/2003 | Kah | |
| 2004/0010181 A1 | 1/2004 | Feeley et al. | |
| 2004/0052391 A1 | 3/2004 | Bren et al. | |
| 2004/0052392 A1 | 3/2004 | Sacha et al. | |
| 2004/0057591 A1* | 3/2004 | Beck | H04R 25/552 381/315 |
| 2004/0077387 A1 | 4/2004 | Sayag et al. | |
| 2004/0136555 A1 | 7/2004 | Enzmann | |
| 2004/0141628 A1 | 7/2004 | Villaverde et al. | |
| 2004/0190739 A1 | 9/2004 | Bachler et al. | |
| 2004/0193090 A1 | 9/2004 | Lebel et al. | |
| 2004/0208333 A1 | 10/2004 | Cheung et al. | |
| 2004/0234090 A1 | 11/2004 | Berg | |
| 2004/0259585 A1 | 12/2004 | Yitzchak et al. | |
| 2005/0008178 A1 | 1/2005 | Joergensen et al. | |
| 2005/0058313 A1 | 3/2005 | Victorian et al. | |
| 2005/0078844 A1 | 4/2005 | Von Ilberg | |
| 2005/0099341 A1 | 5/2005 | Zhang et al. | |
| 2005/0100182 A1 | 5/2005 | Sykes et al. | |
| 2005/0111401 A1 | 5/2005 | Terry | |
| 2005/0160270 A1 | 7/2005 | Goldberg et al. | |
| 2005/0186933 A1* | 8/2005 | Trans | H04L 25/085 455/296 |
| 2005/0197061 A1 | 9/2005 | Hundal | |
| 2005/0244024 A1 | 11/2005 | Fischer et al. | |
| 2005/0249371 A1 | 11/2005 | Vogt | |
| 2005/0283263 A1 | 12/2005 | Eaton et al. | |
| 2006/0013420 A1 | 1/2006 | Sacha | |
| 2006/0018497 A1 | 1/2006 | Kornagel | |
| 2006/0039577 A1 | 2/2006 | Sanguino et al. | |
| 2006/0044140 A1 | 3/2006 | Berg | |
| 2006/0057973 A1 | 3/2006 | Wikel et al. | |
| 2006/0067549 A1 | 3/2006 | Puder et al. | |
| 2006/0068842 A1 | 3/2006 | Sanguino et al. | |
| 2006/0093172 A1 | 5/2006 | Ludvigsen et al. | |
| 2006/0193273 A1 | 8/2006 | Passier et al. | |
| 2006/0193375 A1 | 8/2006 | Lee | |
| 2006/0198529 A1 | 9/2006 | Kjems et al. | |
| 2006/0205349 A1 | 9/2006 | Passier et al. | |
| 2006/0240798 A1 | 10/2006 | Jarosinski et al. | |
| 2006/0245611 A1 | 11/2006 | Jorgensen et al. | |
| 2006/0274747 A1* | 12/2006 | Duchscher | H04R 25/554 370/389 |
| 2007/0004464 A1 | 1/2007 | Lair et al. | |
| 2007/0009123 A1 | 1/2007 | Aschoff et al. | |
| 2007/0009124 A1 | 1/2007 | Larsen | |
| 2007/0025573 A1* | 2/2007 | Nikles | H04R 25/552 381/315 |
| 2007/0060977 A1* | 3/2007 | Spital | A61N 1/37276 607/60 |
| 2007/0066297 A1 | 3/2007 | Heidari-bateni | |
| 2007/0080889 A1 | 4/2007 | Zhang | |
| 2007/0121975 A1 | 5/2007 | Sacha et al. | |
| 2007/0149261 A1 | 6/2007 | Huddart | |
| 2007/0167994 A1* | 7/2007 | Shelton | A61N 1/37252 607/60 |
| 2007/0230727 A1 | 10/2007 | Sanguino et al. | |
| 2007/0248237 A1 | 10/2007 | Bren et al. | |
| 2007/0269065 A1 | 11/2007 | Kilsgaard | |
| 2007/0274550 A1 | 11/2007 | Baechler et al. | |
| 2008/0008341 A1 | 1/2008 | Edwards | |
| 2008/0013769 A1 | 1/2008 | Sacha et al. | |
| 2008/0101635 A1* | 5/2008 | Dijkstra | H04R 25/30 381/315 |
| 2008/0158432 A1 | 7/2008 | Hwang et al. | |
| 2008/0159548 A1 | 7/2008 | Solum | |
| 2008/0165829 A1 | 7/2008 | Lee et al. | |
| 2008/0175421 A1 | 7/2008 | Chizari | |
| 2008/0186241 A1 | 8/2008 | Christensen | |
| 2008/0205664 A1 | 8/2008 | Kim et al. | |
| 2008/0232623 A1 | 9/2008 | Solum et al. | |
| 2008/0260180 A1 | 10/2008 | Goldstien et al. | |
| 2008/0272980 A1 | 11/2008 | Adel et al. | |
| 2008/0304432 A1 | 12/2008 | Lee et al. | |
| 2008/0306745 A1 | 12/2008 | Roy et al. | |
| 2009/0010464 A1 | 1/2009 | Kornagel | |
| 2009/0058635 A1 | 3/2009 | LaLonde et al. | |
| 2009/0173443 A1 | 7/2009 | Kozlak et al. | |
| 2010/0067623 A1 | 3/2010 | Sankabathula et al. | |
| 2010/0124347 A1* | 5/2010 | Greiner | H04R 25/552 381/314 |
| 2010/0148931 A1 | 6/2010 | Pappu et al. | |
| 2010/0195836 A1 | 8/2010 | Platz | |
| 2010/0208631 A1 | 8/2010 | Zhang et al. | |
| 2010/0239111 A1 | 9/2010 | Karamuk et al. | |
| 2010/0246865 A1 | 9/2010 | Suurballe | |
| 2010/0246866 A1 | 9/2010 | Swain et al. | |

(56) References Cited

U.S. PATENT DOCUMENTS

| | | | |
|---|---|---|---|
| 2010/0303185 A1* | 12/2010 | Haartsen | H04W 52/0287 375/362 |
| 2010/0303268 A1 | 12/2010 | Frerking et al. | |
| 2010/0304065 A1 | 12/2010 | Tomantschger et al. | |
| 2010/0321269 A1 | 12/2010 | Ishibana et al. | |
| 2011/0019830 A1 | 1/2011 | Leibman et al. | |
| 2011/0032071 A1 | 2/2011 | Tondering | |
| 2011/0051965 A1 | 3/2011 | Beck et al. | |
| 2011/0090837 A1 | 4/2011 | Duchscher et al. | |
| 2011/0150251 A1 | 6/2011 | Solum et al. | |
| 2011/0150252 A1 | 6/2011 | Solum et al. | |
| 2011/0150254 A1 | 6/2011 | Solum et al. | |
| 2011/0150255 A1 | 6/2011 | Solum | |
| 2011/0249836 A1 | 10/2011 | Solum et al. | |
| 2011/0249837 A1 | 10/2011 | Galster et al. | |
| 2011/0249842 A1 | 10/2011 | Solum et al. | |
| 2011/0299472 A1* | 12/2011 | Kumar | H04B 7/2656 370/328 |
| 2012/0093324 A1 | 4/2012 | Sinasi | |
| 2012/0121094 A1 | 5/2012 | Solum | |
| 2012/0163644 A1 | 6/2012 | Xu et al. | |
| 2012/0177235 A1 | 7/2012 | Solum | |
| 2012/0209101 A1 | 8/2012 | Kidmose et al. | |
| 2012/0310395 A1 | 12/2012 | El-Hoiydi | |
| 2013/0004002 A1 | 1/2013 | Duchscher et al. | |
| 2013/0017786 A1 | 1/2013 | Kvist et al. | |
| 2013/0114579 A1 | 5/2013 | Vujcic | |
| 2013/0129126 A1 | 5/2013 | Callias et al. | |
| 2013/0251180 A1 | 9/2013 | Solum | |
| 2013/0308805 A1 | 11/2013 | Ozden | |
| 2013/0322493 A1 | 12/2013 | Jersenius et al. | |
| 2014/0023216 A1 | 1/2014 | Solum et al. | |
| 2014/0177885 A1 | 6/2014 | Solum | |
| 2014/0198937 A1 | 7/2014 | Sacha et al. | |
| 2015/0023513 A1 | 1/2015 | Solum | |
| 2015/0023539 A1 | 1/2015 | Bauman | |
| 2015/0036855 A1 | 2/2015 | Solum et al. | |
| 2015/0071469 A1 | 3/2015 | Solum et al. | |
| 2015/0172835 A1 | 6/2015 | Sacha et al. | |
| 2015/0201269 A1 | 7/2015 | Dahl | |
| 2016/0037271 A1 | 2/2016 | Polinske et al. | |
| 2016/0044426 A1 | 2/2016 | Duchscher et al. | |
| 2016/0080956 A1 | 3/2016 | Hoole | |
| 2016/0234612 A1 | 8/2016 | Solum et al. | |
| 2017/0041896 A1 | 2/2017 | Solum et al. | |
| 2017/0055217 A1 | 2/2017 | Sen et al. | |

FOREIGN PATENT DOCUMENTS

| | | | |
|---|---|---|---|
| CN | 1191060 A | 8/1998 | |
| CN | 101233786 B | 5/2013 | |
| DE | 2510731 A1 | 9/1976 | |
| DE | 3036417 A1 | 5/1982 | |
| DE | 3443907 A1 | 6/1985 | |
| DE | 10146886 A1 | 4/2003 | |
| EP | 0789474 A2 | 8/1997 | |
| EP | 0941014 A2 | 9/1999 | |
| EP | 0989775 A1 | 3/2000 | |
| EP | 1185138 A2 | 3/2002 | |
| EP | 1196008 A2 | 4/2002 | |
| EP | 1398995 A2 | 3/2004 | |
| EP | 1174003 B1 | 7/2004 | |
| EP | 1445982 A1 | 8/2004 | |
| EP | 1484942 A2 | 12/2004 | |
| EP | 1519625 A2 | 3/2005 | |
| EP | 1531650 A2 | 5/2005 | |
| EP | 1643801 A2 | 4/2006 | |
| EP | 1670283 A1 | 6/2006 | |
| EP | 1681903 A2 | 7/2006 | |
| EP | 1715718 A2 | 10/2006 | |
| EP | 1953934 A1 | 8/2008 | |
| EP | 1980132 B1 | 10/2008 | |
| EP | 2012557 A2 | 1/2009 | |
| EP | 2052758 A1 | 4/2009 | |
| EP | 2002689 B1 | 6/2010 | |
| EP | 2403273 A1 | 1/2012 | |
| EP | 2613566 A1 | 7/2013 | |
| EP | 2765650 A1 | 8/2014 | |
| EP | 2582158 B1 | 8/2016 | |
| FR | 2714561 A1 | 6/1995 | |
| JP | 918998 A | 1/1997 | |
| JP | 10084209 | 3/1998 | |
| JP | 201490467 A | 5/2014 | |
| KR | 101253799 B1 | 4/2013 | |
| WO | WO-9641498 A1 | 12/1996 | |
| WO | WO-1996041498 A1 | 12/1996 | |
| WO | WO-9848526 A2 | 10/1998 | |
| WO | WO-0022874 A2 | 4/2000 | |
| WO | WO-0158064 A1 | 8/2001 | |
| WO | WO-0167433 A1 | 9/2001 | |
| WO | WO-0209363 A2 | 1/2002 | |
| WO | WO-2002009363 A2 | 1/2002 | |
| WO | WO-0223950 A2 | 3/2002 | |
| WO | WO-02061957 A2 | 8/2002 | |
| WO | WO 03008013 * | 1/2003 | ........ A61M 5/14276 |
| WO | WO-03008013 A2 | 1/2003 | |
| WO | WO-04034738 A1 | 4/2004 | |
| WO | WO-2004100607 A1 | 11/2004 | |
| WO | WO-2004110099 A2 | 12/2004 | |
| WO | WO-2005061048 A1 | 7/2005 | |
| WO | WO-2005101731 A2 | 10/2005 | |
| WO | WO-2006023857 A1 | 3/2006 | |
| WO | WO-2006023920 A1 | 3/2006 | |
| WO | WO-2006074655 A1 | 7/2006 | |
| WO | WO-2006078586 A2 | 7/2006 | |
| WO | WO-2006133158 A1 | 12/2006 | |
| WO | WO-2007068243 A1 | 6/2007 | |
| WO | WO-2008151624 A1 | 12/2008 | |
| WO | WO-2009063097 A2 | 5/2009 | |
| WO | WO-2009076949 A1 | 6/2009 | |
| WO | WO-2010033731 A1 | 3/2010 | |
| WO | WO-2012092973 A1 | 7/2012 | |
| WO | WO-2014184394 A2 | 11/2014 | |
| WO | WO-2014198323 A1 | 12/2014 | |
| WO | WO-2016130593 A1 | 8/2016 | |

OTHER PUBLICATIONS

"U.S. Appl. No. 09/659,214, Advisory Action dated Jun. 2, 2003", 3 pgs.

"U.S. Appl. No. 09/659,214, Final Office Action dated Feb. 14, 2003", 7 pgs.

"U.S. Appl. No. 09/659,214, Final Office Action dated Mar. 19, 2003", 7 pgs.

"U.S. Appl. No. 09/659,214, Non Final Office Action dated Jul. 18, 2003", 7 pgs.

"U.S. Appl. No. 09/659,214, Non Final Office Action dated Sep. 6, 2002", 7 pgs.

"U.S. Appl. No. 09/659,214, Notice of Allowance dated Feb. 10, 2004", 6 pgs.

"U.S. Appl. No. 09/659,214, Response filed May 19, 2003 to Final Office Action dated Mar. 19, 2003", 9 pgs.

"U.S. Appl. No. 09/659,214, Response filed Oct. 24, 2003 to Non Final Office Action dated Jul. 18, 2003", 9 pgs.

"U.S. Appl. No. 09/659,214, Response filed Nov. 12, 2002 to Non Final Office Action dated Sep. 6, 2002", 10 pgs.

"U.S. Appl. No. 10/214,045, 312 Amendment filed Jun. 12, 2003", 6 pgs.

"U.S. Appl. No. 10/214,045, Non Final Office Action dated Dec. 2, 2002", 7 pgs.

"U.S. Appl. No. 10/214,045, Notice of Allowance dated Apr. 8, 2003", 17 pgs.

"U.S. Appl. No. 10/214,045, Response filed Apr. 2, 2003 to Non Final Office Action dated Dec. 2, 2002", 8 pgs.

"U.S. Appl. No. 10/243,412, Examiner Interview Summary dated Mar. 9, 2006", 7 pgs.

"U.S. Appl. No. 10/243,412, Final Office Action dated Jan. 9, 2008", 6 pgs.

"U.S. Appl. No. 10/243,412, Non Final Office Action dated May 17, 2007", 10 pgs.

(56) References Cited

OTHER PUBLICATIONS

"U.S. Appl. No. 10/243,412, Non Final Office Action dated Jul. 28, 2006", 10 pgs.
"U.S. Appl. No. 10/243,412, Notice of Allowance dated Jun. 30, 2008", 8 pgs.
"U.S. Appl. No. 10/243,412, Response filed Jan. 16, 2006 to Restriction Requirement dated Dec. 16, 2005", 12 pgs.
"U.S. Appl. No. 10/243,412, Response filed May 9, 2008 to Non-Final Office Action dated Jan. 9, 2008", 12 pgs.
"U.S. Appl. No. 10/243,412, Response filed Sep. 17, 2007 to Non Final Office Action dated May 17, 2007", 15 pgs.
"U.S. Appl. No. 10/243,412, Response filed Dec. 28, 2006 to Non Final Office Action dated Jul. 28, 2006", 16 pgs.
"U.S. Appl. No. 10/243,412, Restriction Requirement dated Dec. 16, 2005", 5 pgs.
"U.S. Appl. No. 10/244,295, Final Office Action dated May 24, 20-07", 11 pgs.
"U.S. Appl. No. 10/244,295, Final Office Action dated Aug. 11, 2006", 9 pgs.
"U.S. Appl. No. 10/244,295, Non Final Office Action dated Feb. 3, 2006", 9 pgs.
"U.S. Appl. No. 10/244,295, Non Final Office Action dated Mar. 11, 2005", 10 pgs.
"U.S. Appl. No. 10/244,295, Non Final Office Action dated Nov. 29, 2006", 12 pgs.
"U.S. Appl. No. 10/244,295, Notice of Allowance dated Aug. 7, 2007", 7 pgs.
"U.S. Appl. No. 10/244,295, Response filed Feb. 28, 2007 to Non Final Office Action dated Nov. 29, 2006", 16 pgs.
"U.S. Appl. No. 10/244,295, Response filed May 3, 2020 to Non-Final Office Action dated Feb. 3, 2006", 17 pgs.
"U.S. Appl. No. 10/244,295, Response filed Jun. 13, 2005 to Non-Final Office Action dated Mar. 11, 2005", 20 pgs.
"U.S. Appl. No. 10/244,295, Response filed Jul. 24, 2007 to Final Office Action dated May 24, 2007", 12 pgs.
"U.S. Appl. No. 10/244,295, Response filed Oct. 11, 2006 to Final Office Action dated Aug. 11, 2006", 17 pgs.
"U.S. Appl. No. 10/284,877, Final Office Action dated Jun. 14, 2006", 11 pgs.
"U.S. Appl. No. 10/284,877, Final Office Action dated Nov. 14, 2006", 11 pgs.
"U.S. Appl. No. 10/284,877, Non Final Office Action dated Mar. 25, 2005", 8 pgs.
"U.S. Appl. No. 10/284,877, Non Final Office Action dated Dec. 1, 2005", 10 pgs.
"U.S. Appl. No. 10/284,877, Notice of Allowance dated Mar. 22, 2007", 7 pgs.
"U.S. Appl. No. 10/284,877, Response filed Mar. 1, 2006 to Non Final Office Action dated Dec. 1, 2005", 17 pgs.
"U.S. Appl. No. 10/284,877, Response filed Mar. 14, 2007 to Final Office Action dated Nov. 14, 2006", 8 pgs.
"U.S. Appl. No. 10/284,877, Response filed Jun. 27, 2005 to Non Final Office Action dated Mar. 25, 2005", 15 pgs.
"U.S. Appl. No. 10/284,877, Response filed Oct. 16, 2006 to Final Office Action dated Jun. 14, 2006", 16 pgs.
"U.S. Appl. No. 11/207,555, Final Office Action dated Jan. 22, 2009", 15 pgs.
"U.S. Appl. No. 11/207,555, Final Office Action dated Feb. 4, 2010", 13 pgs.
"U.S. Appl. No. 11/207,555, Non-Final Office Action dated Jun. 3, 2008", 12 pgs.
"U.S. Appl. No. 11/207,555, Non-Final Office Action dated Jul. 16, 2009", 12 pgs.
"U.S. Appl. No. 11/207,555, Response filed Jun. 22, 2009 to Final Office Action dated Jan. 22, 2009", 9 pgs.
"U.S. Appl. No. 11/207,555, Response filed Nov. 3, 2008 to Non Final Office Action dated Jun. 3, 2008", 8 pgs.
"U.S. Appl. No. 11/207,555, Response filed Nov. 16, 2009 to Non-Final Office Action dated Jul. 15, 2009", 8 pgs.

"U.S. Appl. No. 11/207,591, Final Office Action dated Jan. 6, 2009", 13 pgs.
"U.S. Appl. No. 11/207,591, Final Office Action dated Jan. 15, 2010", 13 pgs.
"U.S. Appl. No. 11/207,591, Non-Final Office Action dated Jul. 14, 2009", 13 pgs.
"U.S. Appl. No. 11/207,591, Non-Final Office Action dated Jul. 28, 2008", 11 pgs.
"U.S. Appl. No. 11/207,591, Non-Final Office Action dated Nov. 16, 2007", 9 pgs.
"U.S. Appl. No. 11/207,591, Response filed May 6, 2008 to Non Final Office Action dated Nov. 16, 2007", 8 pgs.
"U.S. Appl. No. 11/207,591, Response filed May 6, 2009 to Final Office Action dated Jan. 6, 2009", 8 pgs.
"U.S. Appl. No. 11/207,591, Response filed Oct. 14, 2009 to Non Final Office Action dated Jul. 14, 2009", 10 pgs.
"U.S. Appl. No. 11/207,591, Response filed Oct. 28, 2008 to Non Final Office Action dated Jul. 28, 2008", 7 pgs.
"U.S. Appl. No. 11/207,591, Notice of Allowance dated Jul. 1, 2010", 7 pgs.
"U.S. Appl. No. 11/207,591, Response filed Jun. 15, 2010 to Final Office Action dated Jan. 15, 2010", 9 pgs.
"U.S. Appl. No. 11/447,617, Final Office Action dated Mar. 3, 2010", 31 pgs.
"U.S. Appl. No. 11/447,617, Non Final Office Action dated Aug. 31, 2011", 29 pgs.
"U.S. Appl. No. 11/447,617, Non-Final Office Action dated Jun. 22, 2009", 25 pgs.
"U.S. Appl. No. 11/447,617, Notice of Allowance dated Mar. 16, 2012", 8 pgs.
"U.S. Appl. No. 11/447,617, Response filed Feb. 29, 2012 to Non Final Office Action dated Aug. 31, 2011", 13 pgs.
"U.S. Appl. No. 11/447,617, Response filed May 26, 2009 to Restriction Requirement dated Apr. 24, 2009", 8 pgs.
"U.S. Appl. No. 11/447,617, Response filed Aug. 3, 2010 to Final Office Action dated Mar. 3, 2010", 14 pgs.
"U.S. Appl. No. 11/447,617, Response filed Nov. 23, 2009 to Non Final Office Action dated Jun. 22, 2009", 15 pgs.
"U.S. Appl. No. 11/447,617, Restriction Requirement dated Apr. 24, 2009", 6 pgs.
"U.S. Appl. No. 11/456,538, Non-Final Office Action dated Aug. 19, 2010", 25 Pgs.
"U.S. Appl. No. 11/619,541, Non Final Office Action dated Dec. 21, 2010", 7 pgs.
"U.S. Appl. No. 11/619,541, Notice of Allowance dated May 23, 2011", 6 pgs.
"U.S. Appl. No. 11/619,541, Response filed May 23, 11 to Non Final Office Action dated Dec. 21, 2010", 10 pgs.
"U.S. Appl. No. 11/692,763, Non-Final Office Action dated Jan. 21, 2010", 11 pgs.
"U.S. Appl. No. 11/692,763, Response filed Jun. 21, 2010 to Non Final Office Action dated Jan. 21, 2010", 9 pgs.
"U.S. Appl. No. 12/643,540, Advisory Action dated Sep. 25, 2014", 4 pgs.
"U.S. Appl. No. 12/643,540, Advisory Action dated Sep. 26, 2013", 2 pgs.
"U.S. Appl. No. 12/643,540, Corrected Notice of Allowance dated May 6, 2016", 2 pgs.
"U.S. Appl. No. 12/643,540, Final Office Action dated Jun. 5, 2014", 17 pgs.
"U.S. Appl. No. 12/643,540, Final Office Action dated Jun. 7, 2013", 13 pgs.
"U.S. Appl. No. 12/643,540, Final Office Action dated Jul. 2, 2015", 22 pgs.
"U.S. Appl. No. 12/643,540, Non Final Office Action dated Aug. 16, 2012", 14 pgs.
"U.S. Appl. No. 12/643,540, Non Final Office Action dated Dec. 19, 2014", 17 pgs.
"U.S. Appl. No. 12/643,540, Non Final Office Action dated Dec. 30, 2013", 15 pgs.
"U.S. Appl. No. 12/643,540, Notice of Allowance dated Apr. 15, 2016", 10 pgs.

(56) References Cited

OTHER PUBLICATIONS

"U.S. Appl. No. 12/643,540, Response filed Jan. 16, 2013 to Non Final Office Action dated Aug. 16, 2012", 8 pgs.
"U.S. Appl. No. 12/643,540, Response filed Mar. 31, 2014 to Non Final Office Action dated Dec. 30, 2013", 7 pgs.
"U.S. Appl. No. 12/643,540, Response filed Apr. 20, 2015 to Non Final Office Action dated Dec. 19, 2014", 8 pgs.
"U.S. Appl. No. 12/643,540, Response filed Sep. 5, 2014 to Final Office Action dated Jun. 5, 2014", 8 pgs.
"U.S. Appl. No. 12/643,540, Response filed Sep. 6, 2013 to Final Officer Action dated Jun. 7, 2013", 7 pgs.
"U.S. Appl. No. 12/643,540, Response filed Dec. 2, 2015 to Final Office Action dated Jul. 2, 2015", 7 pgs.
"U.S. Appl. No. 12/776,038, Non Final Office Action dated Sep. 27, 2012", 9 pgs.
"U.S. Appl. No. 12/776,038, Notice of Allowance dated Jan. 18, 2013", 9 pgs.
"U.S. Appl. No. 12/776,038, Notice of Allowance dated Jun. 10, 2013", 9 pgs.
"U.S. Appl. No. 12/776,038, Response filed Dec. 26, 2012 to Non Final Office Action dated Sep. 27, 2012", 7 pgs.
"U.S. Appl. No. 12/823,505, Response filed Feb. 4, 2014 to Non Final Office Action dated Nov. 4, 2014", 8 pgs.
"U.S. Appl. No. 12/823,505, Response filed Apr. 23, 2013 to Non Final Office Action dated Jan. 23, 2013", 12 pgs.
"U.S. Appl. No. 12/823,505, Advisory Action dated Oct. 4, 2013", 3 pgs.
"U.S. Appl. No. 12/823,505, Final Office Action dated Apr. 29, 2014", 11 pgs.
"U.S. Appl. No. 12/823,505, Final Office Action dated Jul. 18, 2013", 9 pgs.
"U.S. Appl. No. 12/823,505, Non Final Office Action dated Jan. 23, 2013", 11 pgs.
"U.S. Appl. No. 12/823,505, Non Final Office Action dated Nov. 4, 2013", 9 pgs.
"U.S. Appl. No. 12/823,505, Notice of Allowance dated Jul. 18, 2014", 9 pgs.
"U.S. Appl. No. 12/823,505, Response filed Jun. 30, 2014 to Final Office Action dated Apr. 29, 2014", 8 pgs.
"U.S. Appl. No. 12/823,505, Response filed Sep. 4, 2013 to Restriction Requirement dated Aug. 2, 2013", 6 pgs.
"U.S. Appl. No. 12/823,505, Response filed Sep. 18, 2013 to Final Office Action dated Jul. 18, 2013", 8 pgs.
"U.S. Appl. No. 12/823,505, Response filed Dec. 19, 2012 to Restriction Requirement dated Oct. 19, 2012", 6 pgs.
"U.S. Appl. No. 12/823,505, Restriction Requirement dated Aug. 2, 2012", 6 pgs.
"U.S. Appl. No. 12/823,505, Restriction Requirement dated Oct. 19, 2012", 6 pgs.
"U.S. Appl. No. 12/830,892, Advisory Action dated Sep. 15, 2014", 4 pgs.
"U.S. Appl. No. 12/830,892, Final Office Action dated Apr. 1, 2013", 16 pgs.
"U.S. Appl. No. 12/830,892, Final Office Action dated Jun. 13, 2014", 17 pgs.
"U.S. Appl. No. 12/830,892, Final Office Action dated Jul. 6, 2015", 23 pgs.
"U.S. Appl. No. 12/830,892, Non Final Office Action dated Jan. 29, 2015", 19 pgs.
"U.S. Appl. No. 12/830,892, Non Final Office Action dated Aug. 17, 2012", 15 pgs.
"U.S. Appl. No. 12/830,892, Non Final Office Action dated Dec. 20, 2013", 15 pgs.
"U.S. Appl. No. 12/830,892, Notice of Allowance dated Apr. 8, 2016", 10 pgs.
"U.S. Appl. No. 12/830,892, Response filed Jan. 16, 2013 to Non Final Office Action dated Aug. 17, 2012", 8 pgs.
"U.S. Appl. No. 12/830,892, Response filed Mar. 20, 2014 to Non Final Office Action dated Dec. 20, 2013", 7 pgs.
"U.S. Appl. No. 12/830,892, Response filed Apr. 29, 2015 to Non Final Office Action dated Jan. 29, 2015", 8 pgs.
"U.S. Appl. No. 12/830,892, Response filed Jul. 1, 2013 to Final Office Action dated Apr. 1, 2013", 9 pgs.
"U.S. Appl. No. 12/830,892, Response filed Aug. 18, 2014 to Final Office Action dated Jun. 13, 2014", 8 pgs.
"U.S. Appl. No. 12/830,892, Response filed Nov. 6, 2015 to Final Office Action dated Jul. 6, 2015", 7 pgs.
"U.S. Appl. No. 12/980,696, Non Final Office Action dated Apr. 20, 2011", 7 pgs.
"U.S. Appl. No. 12/981,035, Advisory Action dated Jul. 11, 2013", 3 pgs.
"U.S. Appl. No. 12/981,035, Final Office Action dated Jan. 15, 2014", 17 pgs.
"U.S. Appl. No. 12/981,035, Final Office Action dated Apr. 8, 2013", 17 pgs.
"U.S. Appl. No. 12/981,035, Non Final Office Action dated Aug. 29, 2013", 17 pgs.
"U.S. Appl. No. 12/981,035, Non Final Office Action dated Nov. 20, 2012", 16 pgs.
"U.S. Appl. No. 12/981,035, Notice of Allowance dated Apr. 1, 2014", 9 pgs.
"U.S. Appl. No. 12/981,035, Response filed Feb. 20, 2013 to Non Final Office Action dated Nov. 30, 2012", 7 pgs.
"U.S. Appl. No. 12/981,035, Response filed Mar. 17, 2014 to Final Office Action dated Jan. 15, 2014", 8 pgs.
"U.S. Appl. No. 12/981,035, Response filed Jun. 10, 2013 to Final Office Action dated Apr. 8, 2013", 7 pgs.
"U.S. Appl. No. 12/981,035, Response filed Nov. 27, 2013 to Non Final Office Action dated Aug. 29, 2013", 7 pgs.
"U.S. Appl. No. 12/981,108, Advisory Action dated Jun. 4, 2015", 6 pgs.
"U.S. Appl. No. 12/981,108, Advisory Action dated Oct. 1, 2013", 3 pgs.
"U.S. Appl. No. 12/981,108, Corrected Notice of Allowance dated May 6, 2016", 2 pgs.
"U.S. Appl. No. 12/981,108, Final Office Action dated Jun. 6, 2013", 11 pgs.
"U.S. Appl. No. 12/981,108, Final Office Action dated Dec. 19, 2014", 17 pgs.
"U.S. Appl. No. 12/981,108, Non Final Office Action dated Apr. 3, 2014", 13 pgs.
"U.S. Appl. No. 12/981,108, Non Final Office Action dated Jul. 6, 2015", 23 pgs.
"U.S. Appl. No. 12/981,108, Non Final Office Action dated Aug. 17, 2012", 10 pgs.
"U.S. Appl. No. 12/981,108, Notice of Allowance dated Apr. 14, 2016", 11 pgs.
"U.S. Appl. No. 12/981,108, Response filed Jan. 16, 2013 to Non Final Office Action dated Aug. 17, 2012", 8 pgs.
"U.S. Appl. No. 12/981,108, Response filed Apr. 20, 2015 to Final Offfice Aciton dated Dec. 19, 2014", 8 pgs.
"U.S. Appl. No. 12/981,108, Response filed Jun. 19, 2015 to Advisory Action dated Jun. 4, 2015", 8 pgs.
"U.S. Appl. No. 12/981,108, Response filed Aug. 13, 2014 to Non Final Office Action dated Apr. 3, 2014", 7 pgs.
"U.S. Appl. No. 12/981,108, Response filed Sep. 6, 2013 to Final Office Action dated Jun. 6, 2013", 7 pgs.
"U.S. Appl. No. 12/981,108, Response filed Dec. 4, 2015 to Non Final Office Action dated Jul. 6, 2015", 8 pgs.
"U.S. Appl. No. 13/084,988, Corrected Notice of Allowability dated Jun. 4, 2014", 6 pgs.
"U.S. Appl. No. 13/084,988, Corrected Notice of Allowance dated May 21, 2014", 5 pgs.
"U.S. Appl. No. 13/084,988, Corrected Notice of Allowance dated Jul. 8, 2014", 6 pgs.
"U.S. Appl. No. 13/084,988, Non Final Office Action dated Jan. 17, 2013", 12 pgs.
"U.S. Appl. No. 13/084,988, Non Final Office Action dated Oct. 8, 2013", 11 pgs.
"U.S. Appl. No. 13/084,988, Notice of Allowance dated Apr. 11, 2014", 11 pgs.

(56) References Cited

OTHER PUBLICATIONS

"U.S. Appl. No. 13/084,988, Response filed Jan. 8, 2014 to Non Final Office Action dated Oct. 8, 2013", 9 pgs.
"U.S. Appl. No. 13/084,988, Response filed Jun. 17, 2013 to Non Final Office Action dated Jan. 17, 2013", 8 pgs.
"U.S. Appl. No. 13/253,550, Non Final Office Action dated Aug. 8, 2013", 12 pgs.
"U.S. Appl. No. 13/253,550, Notice of Allowance dated Dec. 11, 2013", 11 pgs.
"U.S. Appl. No. 13/253,550, Response filed Nov. 8, 2013 to Non Final Office Action dated Aug. 8, 2013", 7 pgs.
"U.S. Appl. No. 13/270,860, Non Final Office Action dated Dec. 18, 2012", 5 pgs.
"U.S. Appl. No. 13/270,860, Notice of Allowance dated Apr. 17, 2013", 10 pgs.
"U.S. Appl. No. 13/270,860, Preliminary Amendment filed Jan. 27, 2012", 7 pgs.
"U.S. Appl. No. 13/270,860, Response filed Mar. 18, 2013 to Non Final Office Action dated Dec. 18, 2012", 7 pgs.
"U.S. Appl. No. 13/458,304, Non Final Office Action dated Mar. 3, 2015", 9 pgs.
"U.S. Appl. No. 13/458,304, Response filed Jul. 6, 2015 to Non Final Office Action dated Mar. 3, 2015", 7 pgs.
"U.S. Appl. No. 13/551,215, Advisory Action dated Apr. 10, 2015", 4 pgs.
"U.S. Appl. No. 13/551,215, Advisory Action dated Jul. 20, 2016", 4 pgs.
"U.S. Appl. No. 13/551,215, Examiner Interview Summary dated Jul. 20, 2016", 2 pgs.
"U.S. Appl. No. 13/551,215, Final Office Action dated Apr. 7, 2016", 23 pgs.
"U.S. Appl. No. 13/551,215, Final Office Action dated Dec. 3, 2014", 16 pgs.
"U.S. Appl. No. 13/551,215, Non Final Office Action dated Apr. 24. 2014", 16 pgs.
"U.S. Appl. No. 13/551,215, Non Final Office Action dated Sep. 25, 2015", 23 pgs.
"U.S. Appl. No. 13/551,215, Response filed Feb. 3, 2015 to Final Office Action dated Dec. 3, 2014", 8 pgs.
"U.S. Appl. No. 13/551,215, Response filed Jun. 7, 2016 to Final Office Action dated Apr. 7, 2016", 8 pgs.
"U.S. Appl. No. 13/551,215, Response filed Aug. 8, 2016 to Advisory Action dated Jul. 20, 2016", 8 pgs.
"U.S. Appl. No. 13/551,215, Response filed Aug. 19, 2014 to Non Final Office Action dated Apr. 24, 2014", 9 pgs.
"U.S. Appl. No. 13/551,215, Response filed Dec. 28, 2015 to Non Final Office Action dated Sep. 25, 2015", 8 pgs.
"U.S. Appl. No. 13/946,675, Advisory Action dated May 29, 2015", 5 pgs.
"U.S. Appl. No. 13/946,675, Final Office Action dated Mar. 12, 2015", 21 pgs.
"U.S. Appl. No. 13/946,675, Non Final Office Action dated Aug. 4, 2015", 24 pgs.
"U.S. Appl. No. 13/946,675, Non Final Office Action dated Nov. 7, 2014", 19 pgs.
"U.S. Appl. No. 13/946,675, Preliminary Amendment filed Jun. 23, 2014", 3 pgs.
"U.S. Appl. No. 13/946,675, Response filed Feb. 9, 2015 to Non Final Office Action dated Nov. 7, 2014", 8 pgs.
"U.S. Appl. No. 13/946,675, Response filed May 12, 2015 to Final Office Action dated Mar. 12, 2015", 8 pgs.
"U.S. Appl. No. 13/946,675, Response filed Jul. 13, 2015 to Final Office Action dated Mar. 12, 2015", 8 pgs.
"U.S. Appl. No. 13/970,368, Non Final Office Action dated Jun. 17, 2015", 6 pgs.
"U.S. Appl. No. 13/970,368, Preliminary Amendment dated Mar. 6, 2014", (Mar. 6, 2014), 6 pgs.
"U.S. Appl. No. 13/970,368, Response filed Sep. 16, 2015 to Non Final Office Action dated Jul. 17, 2015", 15 pgs.
"U.S. Appl. No. 14/262,983, Final Office Action dated Jul. 13 2016", 28 pgs.
"U.S. Appl. No. 14/262,983, Non Final Office Action dated Oct. 2, 2015", 20 pgs.
"U.S. Appl. No. 14/262,983, Response filed Jan. 4, 2016 to Non Final Office Action dated Oct. 2, 2015", 8 pgs.
"U.S. Appl. No. 14/452,625, Advisory Action dated Jul. 12, 2017", 3 pgs.
"U.S. Appl. No. 14/452,625, Advisory Action dated Sep. 15, 2016", 4 pgs.
"U.S. Appl. No. 14/452,625, Advisory Action dated Nov. 30, 2015", 4 pgs.
"U.S. Appl. No. 14/452,625, Examiner Interview Summary dated Sep. 15, 2016", 1 pg.
"U.S. Appl. No. 14/452,625, Final Office Action dated Apr. 11, 2017", 20 pgs.
"U.S. Appl. No. 14/452,625, Final Office Action dated Jun. 13, 2016", 20 pgs.
"U.S. Appl. No. 14/452,625, Final Office Action dated Aug. 21, 2015", 17 pgs.
"U.S. Appl. No. 14/452,625, Non Final Office Action dated Jan. 12, 2016", 19 pgs.
"U.S. Appl. No. 14/452,625, Non Final Office Action dated Apr. 6, 2015", 15 pgs.
"U.S. Appl. No. 14/452,625, Non Final Office Action dated Oct. 21, 2016", 18 pgs.
"U.S. Appl. No. 14/452,625, Preliminary Amendment filed Nov. 21, 2014", 8 pgs.
"U.S. Appl. No. 14/452,625, Response filed Jan. 20, 2017 to Non Final Office Action dated Oct. 21, 2016", 7 pgs.
"U.S. Appl. No. 14/452,625, Response filed Apr. 12, 2016 to Non Final Office Action dated Jan. 12, 2016", 7 pgs.
"U.S. Appl. No. 14/452,625, Response Filed Jun. 12, 2017 to Final Office Action dated Apr. 11, 2017", 7 pgs.
"U.S. Appl. No. 14/452,625, Response filed Jul. 6, 2015 to Non Final Office Action dated Apr. 6, 2015", 8 pgs.
"U.S. Appl. No. 14/452,625, Response filed Aug. 15, 2016 to Final Office Action dated Jun. 13, 2016", 9 pgs.
"U.S. Appl. No. 14/452,625, Response filed Oct. 21, 2015 to Final Office Action dated Aug. 21, 2015", 7 pgs.
"U.S. Appl. No. 14/462,010, Final Office Action dated Dec. 2, 2015", 19 pgs.
"U.S. Appl. No. 14/462,010, Non Final Office Action dated May 28, 2015", 8 pgs.
"U.S. Appl. No. 14/462,010, Notice of Allowance dated Mar. 25, 2016", 12 pgs.
"U.S. Appl. No. 14/462,010, Response filed Mar. 2, 2016 to Final Office Action dated Dec. 2, 2015", 10 pgs.
"U.S. Appl. No. 14/462,010, Response filed Aug. 27, 2015 to Non Final Office Action dated May 28, 2015", 6 pgs.
"U.S. Appl. No. 14/543,173, Final Office Action dated Jan. 20, 2016", 5 pgs.
"U.S. Appl. No. 14/543,173, Non Final Office Action dated Aug. 25, 2015", 14 pgs.
"U.S. Appl. No. 14/543,173, Notice of Allowance dated May 4, 2016", 13 pgs.
"U.S. Appl. No. 14/543,173, Preliminary Amendment filed Jul. 13, 2015", 7 pgs.
"U.S. Appl. No. 14/543,173, Response filed Mar. 21, 2016 to Final Office Action dated Jan. 20, 2016", 6 pgs.
"U.S. Appl. No. 14/543,173, Response filed Nov. 25, 2015 to Non Final Office Action dated Aug. 25, 2015", 11 pgs.
"U.S. Appl. No. 14/543,173, Supplemental Notice of Allowability dated May 25, 2016", 2 pgs.
"U.S. Appl. No. 14/815,032, Non Final Office Action dated May 19, 2017", 14 pgs.
"U.S. Appl. No. 14/920,446, Advisory Action dated Aug. 15, 2017", 2 pgs.
"U.S. Appl. No. 14/920,446, Final Office Action dated May 4, 2017", 9 pgs.
"U.S. Appl. No. 14/920,446, Non Final Office Action dated Sep. 22, 2016", 8 pgs.

(56) References Cited

OTHER PUBLICATIONS

"U.S. Appl. No. 14/920,446, Respons Filed Aug. 4, 2017 to Final Office Action dated May 4, 2017", 9 pgs.
"U.S. Appl. No. 14/920,446, Response filed Dec. 21, 2016 to Non Final Office Action dated Sep. 22, 2016", 8 pgs.
"U.S. Appl. No. 15/236,978, Final Office Action dated Aug. 2, 2018", 9 pgs.
"U.S. Appl. No. 15/236,978, Non Final Office Action dated Jan. 17, 2018", 11 pgs.
"U.S. Appl. No. 15/236,978, Notice of Allowance dated Oct. 4, 2018", 12 pgs.
"U.S. Appl. No. 15/236,978, Preliminary Amendment filed Oct. 26, 2016", 5 pgs.
"U.S. Appl. No. 15/236,978, Response Filed Apr. 13, 2018 to Non Final Office Action dated Jan. 17, 2018", 7 pgs.
"U.S. Appl. No. 15/236,978, Response filed Sep. 20, 2018 to Final Office Action dated Aug. 2, 2018", 7 pgs.
"Chinese Application Serial No. 2,609,979, Response filed Aug. 16, 2011 to Office Action dated Apr. 12, 2011", w/English claims, 15 pgs.
"Chinese Application Serial No. 200680028085.8, Office Action dated Apr. 12, 2011", w/English translation, 3 pgs.
"Chinese Application Serial No. 200680028085.8, Office Action dated Sep. 30, 2011", w/English translation, 8 pgs.
"Chinese Application Serial No. 200680028085.8, Office Action dated Jun. 29, 2012", w/English translation, 8 pgs.
"Chinese Application Serial No. 200680028085.8, Response filed Apr. 13, 2012 to Office Action dated Sep. 30, 2011", w/English claims, 15 pgs.
"Chinese Application Serial No. 200680028085.8, Response filed Nov. 14, 2012 to Office Action dated Jun. 29, 2012", w/English claims, 14 pgs.
"European Application Serial No. 05791651.2, Office Action dated Mar. 15, 2011", 5 pgs.
"European Application Serial No. 06772250.4, Office Action dated Oct. 18, 2012", 5 pgs.
"European Application Serial No. 10252054.1, Extended Search Report dated Sep. 14, 2012", 6 pgs.
"European Application Serial No. 05790836.0, Office Action dated Jun. 4, 2009", 3 pgs.
"European Application Serial No. 05791651.2, Examiner Interview Summary dated Mar. 2812", (Mar. 28, 2012), 4 pgs.
"European Application Serial No. 05791651.2, Office Action Response Filed Jul. 7, 2011", 11 pgs.
"European Application Serial No. 05791651.2, Oral Proceedingsdated May 3, 2012", (May 3, 2012), 3 pgs.
"European Application Serial No. 05791651.2, Summons to Attend Oral Proceedings dated Jan. 20, 2012", 4 pgs.
"European Application Serial No. 05791651.2, Written Decision to Refuse dated May 3, 2012", (05/03/12), 17 pgs.
"European Application Serial No. 05791651.2, Written Submission filed Mar. 16, 2012", (Mar. 16, 2012), 51 pgs.
"European Application Serial No. 06772250.4, Communication Pursuant to Article 94(3) EPC dated Sep. 17, 2015", 5 pgs.
"European Application Serial No. 06772250.4, Office Action dated Dec. 22, 2010", 3 pgs.
"European Application Serial No. 06772250.4, Response filed Apr. 25, 2013 to Office Action dated Oct. 18, 2012", 7 pgs.
"European Application Serial No. 06772250.4, Response filed Jun. 24, 2011 to Office Action dated Dec. 22, 2010", 18 pgs.
"European Application Serial No. 07250920.1, Response filed Aug. 22, 2014 to European Extended Search Report dated Jan. 23, 2014", 21 pgs.
"European Application Serial No. 07252582.7, Extended European Search Report dated Apr. 4, 2008", 7 pgs.
"European Application Serial No. 07252582.7, Office Action dated Feb. 6, 2009", 2 pgs.
"European Application Serial No. 07254947.0, Extended European Search Report dated Apr. 3, 2008", 6 pgs.
"European Application Serial No. 07254947.0, Office Action dated Aug. 25, 2008", 1 pgs.
"European Application Serial No. 07254947.0, Office Action dated Jan. 19, 2012", 5 pgs.
"European Application Serial No. 07254947.0, Office Action dated Oct. 12, 2010", 4 pgs.
"European Application Serial No. 07254947.0, Response filed Apr. 26, 2011 to Official Communication dated Oct. 12, 2010", 11 pgs.
"European Application Serial No. 07254947.0, Response filed Jul. 20, 2012 to Examination Notification Art. 94(3) dated Jan. 19, 2012", 9 pgs.
"European Application Serial No. 07254947.0, Response filed Feb. 28, 2009 to Official Communication dated Aug. 25, 2008", 2 pgs.
"European Application Serial No. 07254947.0, Summons to Attend Oral Proceedings dated Nov. 7, 2014", 3 pgs.
"European Application Serial No. 10252054.1, Response filed Apr. 17, 2013 to Extended European Search Report dated Sep. 14, 2012", 23 pgs.
"European Application Serial No. 11184383.5 , Summons to Attend Oral Proceedings dated Aug. 29, 2013", (Aug. 29, 2013), 5 pgs.
"European Application Serial No. 11184383.5, Extended European Search Report dated Jul. 31, 2012", 7 pgs.
"European Application Serial No. 11184383.5, Office Action dated Mar. 8, 2013", 7 pgs.
"European Application Serial No. 11184383.5, Response filed Feb. 14, 2013 to Extended European Search Report dated Jul. 31, 2012", 23 pgs.
"European Application Serial No. 11184383.5, Response filed Jul. 12, 2013 to Office Action dated Mar. 8, 2013", 11 pgs.
"European Application Serial No. 11184383.5, Summons to Attend Oral Proceedings dated Aug. 29, 2013", 5 pgs.
"European Application Serial No. 11250442.8, Examination Notification Art. 94(3) dated Mar. 25, 2015", 5 pgs.
"European Application Serial No. 11250442.8, Extended European Search Report dated Aug. 18, 2011", 6 pgs.
"European Application Serial No. 11250442.8, Response filed Apr. 17, 2012 to Extended Search Report dated Aug. 18, 2011", 28 pgs.
"European Application Serial No. 11250442.8, Response filed Jul. 30, 2015 to Examination Notification Art. 94(3) dated Mar. 25, 2015", 11 pgs.
"European Application Serial No. 13150071.2, Extended European Search Report dated Feb. 15, 2013", 7 pgs.
"European Application Serial No. 13150071.2, Response filed Oct. 17, 2013 to Extended European Search Report dated Feb. 15, 2013", 23 pgs.
"European Application Serial No. 13176910.1, Extended European Search Report dated Jan. 23, 2014", 9 pgs.
"European Application Serial No. 14177405.9, Extended European Search Report dated Jan. 5, 2015", (Jan. 5, 2015), 7 pgs.
"European Application Serial No. 14177405.9, Response filed Jul. 21, 2015 to Extended European Search Report dated Jan. 5, 2015", 11 pgs.
"European Application Serial No. 14187742.3, Extended European Search Report dated Dec. 1, 2014", 6 pgs.
"European Application Serial No. 14187742.3, Response filed Jul. 14, 2015 to Extended European Search Report dated Dec. 1, 2014", 36 pgs.
"Hearing Aids—Part 12: Dimensions of electrical connector systems", IEC 118-12, (1996), 24 pgs.
"Hearing Aids—Part 6: Characteristics of electrical input circuits for hearing aids", IEC 60118-6, (1999), 12 pgs.
"International Application Serial No. PCT/US2005/029793, International Preliminary Report on Patentability dated Mar. 1, 2007", 5 pgs.
"International Application Serial No. PCT/US2005/029793, International Search Report dated Jan. 5, 2006", 7 pgs.
"International Application Serial No. PCT/US2005/029793, Written Opinion dated Jan. 5, 2006", 4 pgs.
"International Application Serial No. PCT/US2005/029971, International Preliminary Report on Patentability dated Mar. 1, 2007", 6 pgs.
"International Application Serial No. PCT/US2005/029971, International Search Report dated Jan. 5, 2006", 7 pgs.

(56) References Cited

OTHER PUBLICATIONS

"International Application Serial No. PCT/US2005/029971, Written Opinion dated Jan. 5, 2006", 4 pgs.
"International Application Serial No. PCT/US2006/021870, International Preliminary Report on Patentability dated Dec. 6, 2007", 8 pgs.
"International Application Serial No. PCT/US2006/021870, International Search Report and Written Opinion dated Nov. 3, 2006", 13 pgs.
"International Application Serial No. PCT/US2016/017214, International Search Report dated Jun. 10, 2016", 4 pgs.
"International Application Serial No. PCT/US2016/017214, Written Opinion dated Jun. 20, 2016", 7 pgs.
"Kleer Announces Reference Design for Wireless Earphones", [Online]. Retrieved from the Internet: <URL:http://kleer.com/newsevents/press_releases/prjan2.php>, (Jan. 2, 2007), 2 pgs.
"Korean Application Serial No. 10-2008-7000332, Office Action dated Aug. 15, 2012", w/English translation, 9 pgs.
"Korean Application Serial No. 10-2008-7000332, Response filed oct. 15, 2012 to Office Action dated Aug. 15, 2012", w/English claims, 22 pgs.
"Korean Application Serial No. 10-2008-7000332, Voluntary Amendment filed Jun. 9, 2011", w/ English Translation, 14 pgs.
Beck, L. B., "The "T" Switch; Some Tips for Effective Use", Shhh, (Jan./Feb. 1989), 12-15.
Davis, A., et al., "Magnitude of Diotic Summation in Speech-in-Noise Tasks: Performance Region and Appropriate Baseline", British Journal of Audiology, 24, (1990), 11-16.
Gilmore, R., "Telecoils: past, present & future", Hearing Instruments, 44 (2), (1993), 22-23, 26-27, 40.
Greefkes, J. A, et al., "Code Modulation with Digitally Controlled Companding for Speech Transmission", Philips Tech. Rev., 31(11/12), (1970), 335-353.
Haartsen, J., "Bluetooth-The Universal Radio Interface for Ad Hoc, Wireless Connectivity", Ericsson Review, No. 3, (1998), 110-117.
Halverson, H. M., "Diotic Tonal vols. as a Function of Difference of Phase", The American Journal of Psychology, 33(4), (Oct. 1922), 526-534.
Hansaton Akustik GmbH, "48 K-AMP Contactmatic", (from Service Manual), (Apr. 1996), 8 pgs.
Lacanette, Kerry, "A Basic Introduction to Filters—Active, Passive, and Switched-Capacitor", National Semiconductor Corporation, http://www.swarthmore.edu/NatSci/echeeve1/Ref/DataSheet/Inttofilters.pdf, (Apr. 1991), 122.
Lindemann, Eric, "Two Microphone Nonlinear Frequency Domain Beamformer for Hearing Aid Noise Reduction", Proc. IEEE Workshop on Applications of Signal Processing to Audio and Acoustics, (1995), 24-27.
Liu, Tao, et al., "Performance Evaluation of Link Quality Estimation Metrics for Static Multihop Wireless Sensor Networks", Mesh and Ad Hoc Communications and Networks SECON '09. 6th Annual IEEE Communications Society Conference on, IEEE, Piscataway, (Jun. 22, 2009), 1-9.
Lybarger, S. F, "Development of a New Hearing Aid with Magnetic Microphone", Electrical Manufacturing, (Nov. 1947), 11 pgs.
Peissig, J., et al., "Directivity of binaural noise reduction in spatial multiple noise-source arrangements for normal and impaired listeners", J Acoust Soc Am., 101(3), (Mar. 1997), 1660-70.

Preves, D. A., "A Look at the Telecoil—Its Development and Potential", SHHH Journal, (Sep./Oct. 1994), 7-10.
Preves, David A., "Field Trial Evaluations of a Switched Directional/Omnidirectional In-the-Ear Hearing Instrument", Journal of the American Academy of Audiology, 10(5), (May 1999), 273-283.
Schaefer, Conrad, "Letter referencing Micro Ear Patent", (Aug. 22, 2002), 2 pgs.
Srinivasan, S., "Low-bandwidth binaural beamforming", IEEE Electronics Letters, 44(22), (Oct. 23, 2008), 1292-1293.
Srinivasan, Sriram, et al., "Beamforming under Quantization Errors in Wireless Binaural Hearing Aids", EURASIP Journal on Audio, Speech, and Music Processing, vol. 2008, Article ID 824797, (Jan. 28, 2008), 8 pgs.
Teder, Harry, "Something New in CROS", Hearing Instruments, vol. 27, No. 9, Published by Harcourt Brace Jovanovich, (Sep. 1976), 18-19.
Valente, Michael, et al., "Audiology: Treatment", Thieme Medical Publishers, (Mar. 1, 2000), 594-599.
Zelnick, E., "The Importance of Interaural Auditory Differences in Binaural Hearing", Binaural Hearing and Amplification, vol. 1, (1980), 81-103.
"U.S. Appl. No. 13/551,215, Final Office Action dated Feb. 8, 2017", 21 pgs.
"U.S. Appl. No. 14/262,983, Advisory Action dated Sep. 30, 2016", 3 pgs.
"U.S. Appl. No. 14/262,983, Examiner Interview Summary dated Dec. 15, 2016", 2 pgs.
"U.S. Appl. No. 14/262,983, Notice of Allowance dated Dec. 22, 2016", 11 pgs.
"U.S. Appl. No. 14/262,983, Response filed Sep. 13, 2016 to Final Office Action dated Jul. 13, 2016", 8 pgs.
"U.S. Appl. No. 15/019,895, Non Final Office Action dated Dec. 29, 2016", 10 pgs.
"U.S. Appl. No. 15/019,895, Notice of Allowance dated May 25, 2017", 13 pgs.
"U.S. Appl. No. 15/019,895, Notice of Allowance dated May 25, 2017", 12 pgs.
"U.S. Appl. No. 15/019,895, Response filed Mar. 29, 2017 to Non Final Office Action dated Dec. 29, 2017", 7 pgs.
"U.S. Appl. No. 15/019,895, Examiner Interview Summary dated May 25, 2017", 1 pg.
"European Application Serial No. 13176910.1, Communication Pursuant to Article 94(3) EPC dated Nov. 29, 2016", 6 pgs.
"European Application Serial No. 13176910.1, Response filed Jun. 9, 2017 to Communication Pursuant to Article 94(3) EPC dated Nov. 29, 2016", 8 pgs.
"European Application Serial No. 14187742.3, Communication Pursuant to Article 94(3) EPC dated Oct. 12, 2016", 5 pgs.
"European Application Serial No. 14187742.3, Response filed Apr. 27, 2017 to Communication Pursuant to Article 94(3) EPC dated Oct. 12, 2016", 23 pgs.
"Impedance-matching devices, L-section and Transmission lines", Wikipedia, Sections, [Online] retrieved from the internet: <https://en.wikipedia.org/wiki/Impedance_matching>, 13 pgs.
"International Application Serial No. PCT/US2016/017214, International Preliminary Report on Patentability dated Aug. 24, 2017", 9 pgs.

* cited by examiner

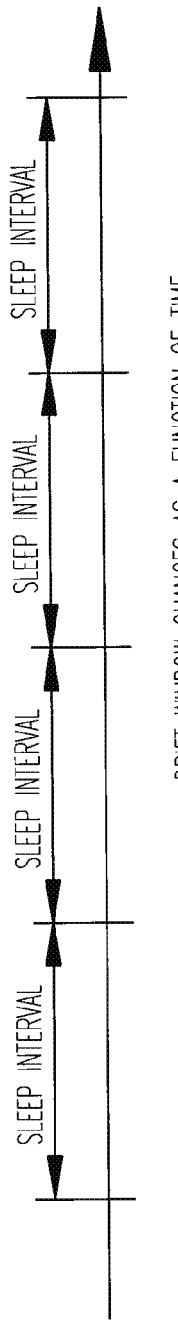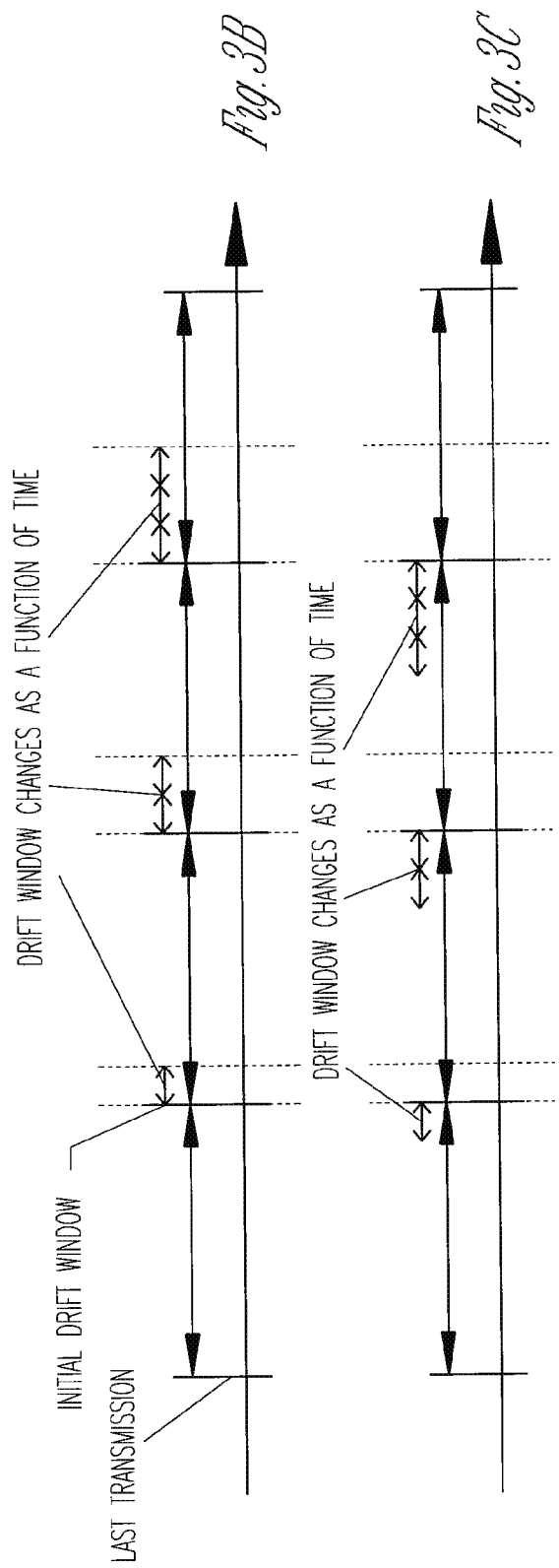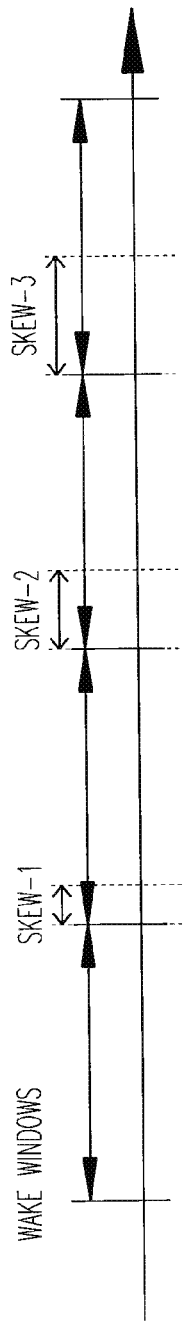

LOW POWER INTERMITTENT MESSAGING FOR HEARING ASSISTANCE DEVICES

RELATED APPLICATION

This patent application is a continuation of U.S. patent application Ser. No. 15/236,978, filed Aug. 15, 2016, now issued as U.S. Pat. No. 10,212,682, which is a continuation of U.S. patent application Ser. No. 12/830,892, filed Jul. 6, 2010, now issued as U.S. Pat. No. 9,420,385, which is a continuation-in-part of commonly owned U.S. patent application Ser. No. 12/643,540, filed on Dec. 21, 2009, now issued as U.S. Pat. No. 9,426,586, each of which are incorporated herein by reference in their entirety.

FIELD OF THE INVENTION

The present subject matter relates generally to hearing assistance devices, including, but not limited to hearing aids, and in particular to low power intermittent messaging for hearing assistance devices.

BACKGROUND

Modern hearing assistance devices typically include digital electronics to enhance the wearer's experience. In the specific case of hearing aids, current designs employ digital signal processors rich in features. Their functionality is further benefited from communications, either from a remote source or from ear-to-ear for advanced processing. Thus, it is desirable to add wireless functionality to a hearing instrument to allow for functions such as ear to ear synchronization, remote control, programming and configuration, streaming audio, bi-directional audio, etc. Many of the functions in a hearing aid such as volume control, memory select, etc. are changed or modified on an intermittent basis. Further, the RF transceiver within the hearing aid consumes a significant amount of power for both transmission and reception of wireless signals. Because of the intermittent nature of many of the control functions in a hearing aid, it is desirable to build a communication system that uses as little power as necessary to communicate the information, either from a remote device or from one aid to another. Events including, but not limited to, volume control changes and variation in background noise happen intermittently and at irregular intervals and it is important that related information is shared and thus synchronized with both hearing instruments. Radio communications using frequencies above 200 MHz in a hearing instrument allow for far field electromagnetic transmissions. These frequencies can be used at close range such as ear to ear communication and longer range (for example, greater than 2 meters) for functions such as remote control, configuration and streaming audio. In the unlicensed ISM bands of 900 MHz and 2.4 GHz, there can be multiple competing radiating devices that can interfere with low power communications. The situation is made worse when the desired communications are intermittent and the interferers have high power and/or long duty cycles.

What is needed in the art is a system for low power communications in a hearing assistance device. The system should support intermittent communications for the hearing assistance device. It should be useable in environments with radio frequency interference.

SUMMARY

Disclosed herein, among other things, are methods and apparatus for low power intermittent communications for a hearing assistance device. The present subject matter includes methods for communications between a transmitter having a first clock and a receiver having a second clock, the method comprising synchronizing the first clock and the second clock at a synchronization time; determining a time interval between the synchronization time and a transmission time of a transmission; calculating a drift window using a potential drift amount between the first clock and the second clock over the time interval; and transmitting the transmission with the transmitter, the transmission including a preamble having a preamble length based on the drift window or a packet repetition rate and duration based on the drift window. In various embodiments the first clock or the second clock or both clocks are adjusted to compensate for any measured difference in rate between the first clock and the second clock. In various embodiments, the preamble length is at least the length of a clock accuracy multiplied by the time interval from the last synchronization. In various embodiments the packet is continuously repeated for at least the length of the clock accuracy multiplied by the time interval from the last synchronization. Some systems receive with the receiver at a plurality of predetermined sleep intervals by activating the receiver for a duration of time of at least the drift window at each sleep interval to determine if a signal is present. In various embodiments, the transmission includes one or more packets. The system also allows for applications which provide for changing to a new receive channel in various circumstances. In various embodiments, the transmitter sends a packet upon detection of an event, including but not limited to an ear-to-ear event. In various applications the receiver or transmitter is disposed within a hearing aid. In various applications the transmitter is disposed within a first hearing aid and the receiver is disposed within a second hearing aid, the first and second hearing aids adapted to be worn by one wearer. The system employs different synchronization approaches in various embodiments.

In various embodiments, the present subject matter includes a system, comprising: a receiver including a first clock having a first frequency drift, the receiver adapted to receive on sleep intervals using the first clock as a timer; and a transmitter including a second clock, having a second frequency drift, the transmitter adapted to transmit at a time which is a multiple of the sleep interval using the second clock as a timer, wherein the transmitter is adapted to transmit a packet having a preamble of a length that increases with a time between transmissions based on one or more of the first and second frequency drifts, the preamble length selected to ensure detection of the packet by the receiver. In various embodiments the transmitter is adapted to transmit multiple packets for a duration that increases with a time between transmissions based on one or more of the first and second frequency drifts, the duration of time is selected to ensure detection of at least one packet by the receiver. In various embodiments the receiver is adapted to change channel of reception when signals are received but a packet is not detected. Various applications wherein a receiver or transmitter is used with one or more hearing aids are provided.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIGS. 3A to 3D show some timing considerations for reception of signals according to various embodiments of the present subject matter.

DETAILED DESCRIPTION

Figure 1:
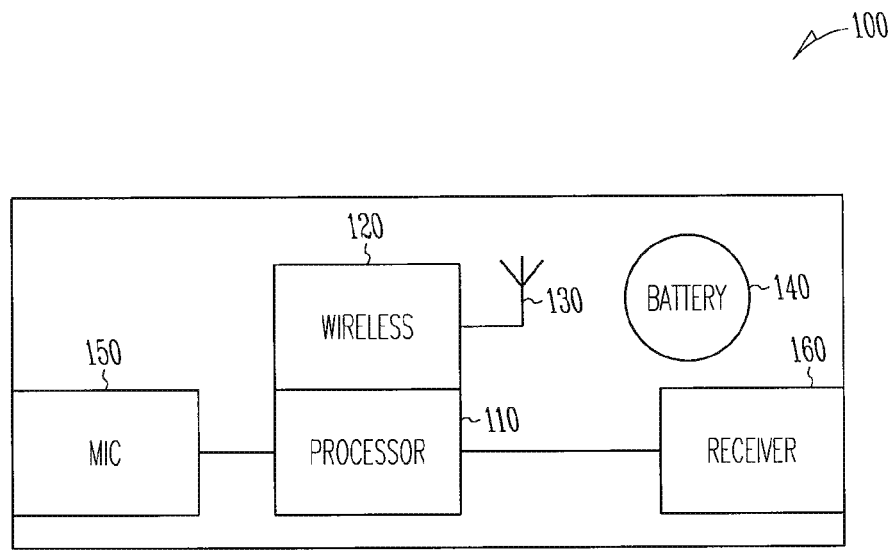
FIG. 1 shows a hearing assistance device adapted to perform intermittent messaging, according to one embodiment of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates generally to hearing assistance devices, including, but not limited to hearing aids, and in particular to low power intermittent messaging for hearing assistance devices.

The present subject matter includes a system for communications between a transmitter and a receiver. In various embodiments, the system uses a sleep interval to allow the receiver to go to sleep between wake up times to "sniff" for transmissions from the transmitter. The system adjusts the length of the preamble or the duration of repetition of packets and the time of the start of transmission of the transmitted signal to allow the receiver to detect a transmitted signal based on drift in the clocks of the system. In various embodiments, the preamble length or the duration of repetition of packets and any offset to the start of transmission is calculated based on the time between the last transmission and the next planned transmission and the drift rate between clocks on the transmitter and receiver. In various embodiments, the preamble length is at least the largest possible drift of the clocks from an integral number of sleep intervals with respect to a synchronization event. In one embodiment, the preamble is at least the length of a frequency drift percentage of both clocks multiplied by a time interval. In various embodiments the duration of repeated packets is at least the length of a frequency drift percentage of both clocks multiplied by a time interval. In one embodiment, a drift window is scaled with the number of sleep intervals between transmissions. In various embodiments, the clocks are calibrated to reduce the preamble length. In various embodiments the clocks are adjusted using a PLL or other adjustment scheme to reduce or minimize drift. Further, the present subject matter includes adjusting width of the receive time window on the receiver while maintaining a short preamble on the transmitter. Also the present subject matter includes not only adjustment of the receive window or the transmit preamble or the duration of repeated packets to establish communication and transfer information but adjustment of the clock frequency using a soft PLL to maintain the lowest possible drift between transmitter and receiver, thus further lowering power consumption.

In various embodiments, the system can determine adjustments to one or more clocks to account for skew between the clocks. For example, in one embodiment, the receiver determines a duration of time between an expected time of receipt of the transmission and the actual time of receipt of the transmission. That duration of time can be used as an offset to correct for skew between the clocks. In various embodiments, successful receipt of a transmission can serve as an opportunity to synchronize the clocks. In various embodiments, synchronization can be scheduled to be performed at intervals. In various embodiments, synchronization can be accomplished upon a certain preamble length limitation. In various embodiments, synchronization is performed after a certain number of successful receipts of transmissions. Thus, in various embodiments the system for synchronization can be determined in a variety of ways.

In various embodiments, a receive channel is changed if a signal is not received at a prior channel selection. In various embodiments, the transmission is determined by detection of an event and is generally asynchronous. In various embodiments, the event is an ear-to-ear event. In various embodiments, the receiver and transmitter are in opposite hearing aids adapted to be worn by one wearer. In various embodiments the communication is periodic to maintain synchronization.

The present subject matter also includes a system including a receiver adapted to receive on sleep intervals using a first clock as a timer and a transmitter adapted to transmit at a time which is a multiple of the sleep interval using a second clock as a timer, wherein the transmitter is adapted to transmit a packet having a preamble of a length that increases with a time between transmissions based on one of the first and second clock frequency drift percentages, the preamble length selected to ensure detection of the packet by the receiver regardless of drift of the first and second clocks. In various embodiments, the receiver is adapted to change channel of reception when signals are received but a packet is not detected. In various embodiments, the present subject matter is used in a first hearing aid and a second hearing aid. In various embodiments the transmitter is adapted to transmit a similar packets more or less continuously for a duration that increases with a time between successful resynchronization events based on one of the first and second clock frequency drift percentages, the duration being selected to ensure detection of the packet by the receiver regardless of drift of the first and second clocks. Further the repeated packet may contain a sequence number that remains the same to prevent the receiver from acting multiple times on the data contained therein.

FIG. 1 shows a hearing assistance device adapted to perform intermittent messaging, according to one embodiment of the present subject matter. Hearing assistance device 100 includes a processor 110 and wireless electronics 120. The electronics are powered at least in part by battery 140.

In various embodiments, the hearing assistance device 100 includes a microphone 150 and a speaker, also known as a receiver, 160. In hearing aid applications, the processor is adapted to receive sound signals from the microphone 150 and processed to provide adjustable gain to offset hearing loss of the wearer of the hearing aid. In various embodiments, signals received by the wireless electronics 120 can be processed if desired.

Figure 2:
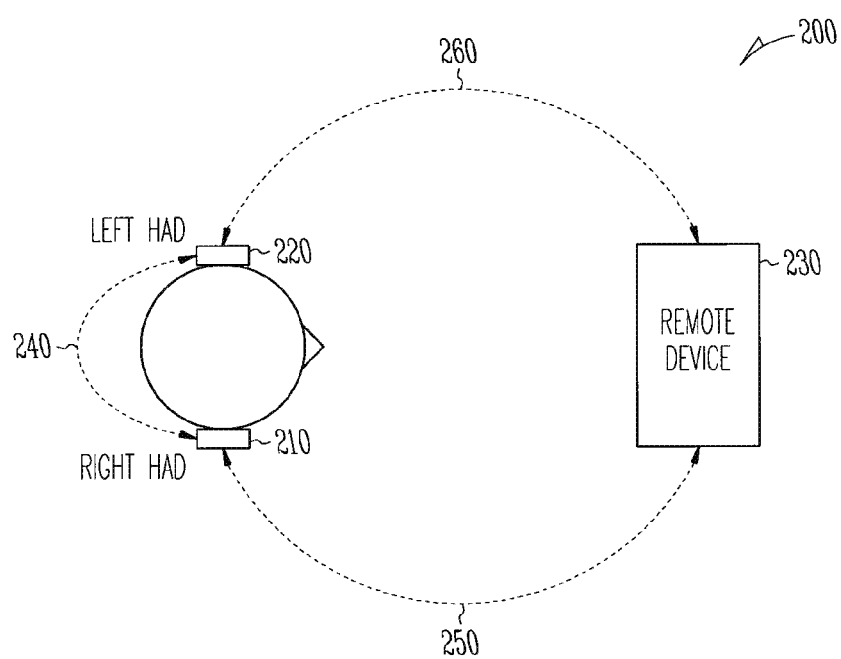
FIG. 2 shows a plurality of different communications that can be supported, according to various embodiments of the present subject matter.

In hearing aid applications, in various embodiments the processor 110 includes a digital signal processor in communication with the wireless electronics 120 to perform communications. In various embodiments, the processor and wireless electronics are adapted to perform communications as set forth herein. FIG. 2 shows a plurality of different communications that can be supported, according to various embodiments of the present subject matter. System 200 demonstrates that such communications include ear-to-ear communications 240 or ear-to-remote-device communications 250 or 260 with remote device 230. It is understood that these communications can be unidirectional, bidirectional, or combinations of both. Such communications can also include far field communications (e.g., radio frequency communications), or combinations of near field (e.g., inductive link using substantially the magnetic field) and far field communications. It is understood that remote device 230 can be any wireless devices, including, but not limited to a wireless audio controller such as that described in U.S. Patent Application Publication 2006/0274747, titled: COMMUNICATION SYSTEM FOR WIRELESS AUDIO DEVICES, and PCT Application Publication WO 2006/133158, titled: COMMUNICATION SYSTEM FOR WIRELESS AUDIO DEVICES, which are both hereby incorporated by reference in their entirety.

In various embodiments the wireless communications can include standard or nonstandard communications. Some examples of standard wireless communications include link protocols including, but not limited to, Bluetooth™ IEEE 802.11(wireless LANs), 802.15(WPANs), 802.16 (WiMAX), cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection between devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. Such connections include all past and present link protocols. It is also contemplated that future versions of these protocols and new future standards may be employed without departing from the scope of the present subject matter.

FIGS. 3A to 3D show some timing considerations for reception of signals according to various embodiments of the present subject matter. FIG. 3A shows a plurality of consecutive sleep intervals. A sleep interval is the time that a receiver is programmed to sleep between checking for signals from a transmitter transmitting according to the protocol. FIG. 3B demonstrates that for a known frequency drift, an initial drift window can be calculated. The initial drift window is the maximum amount of time the receiver timing can skew with respect to the transmitter during one sleep interval.

FIG. 3B also shows that over time this potential drift window expands. The drawings are not to scale, but demonstrate that the drift window will increase linearly with time. FIG. 3B depicts the case where the drift causes lag over time. Of course, the drift may be smaller than the window, so these drift windows amount to the highest amount of drift possible. FIG. 3C shows the case where the drift accelerates or leads the sleep window interval. Thus, FIG. 3D shows the worst possible skew due to drift which is called a wake window. Thus, for a known sleep interval, a known drift window, and a known amount of time since the last reception of a signal, a wake window can be calculated which grows linearly with time, as shown in FIG. 3D. Thus, the wake window is the period that the receiver must stay awake to receive a transmission having a preamble of at least the duration of the wake window.

Such windowed systems use a recognizable packet preamble to signal that a data payload is being transmitted next and thereby detect the preamble and thus the following payload. According to various embodiments of the present subject matter, a packet with a preamble that is at least the drift window as a function of time (equal to the wake window) will be detectable by a properly synchronized receiver. This approach allows for a conservation of energy by the transmitter because it can provide smaller preambles than other systems which offer a preamble the duration of the sleep window interval. Thus, the smaller the initial drift amount, the shorter the preamble needed for detection. Power consumption is inversely related to the sleep time of the system. Thus increasing the sleep interval lowers the power consumption and increases the latency. If the transmitter and receiver had no knowledge of each other's clock drift and no adjustment was made to minimize it, the transmitter would have to send a preamble that had a length at least equal to the receive sleep interval. However, if the transmitter has some knowledge of the receivers drift rate then it can adjust it's wakeup preamble accordingly based on the last communication. It may also be possible for either the transmitter or the receiver to adjust its timing to match that of the other receiver or transmitter to which it is paired with.

Figure 4:
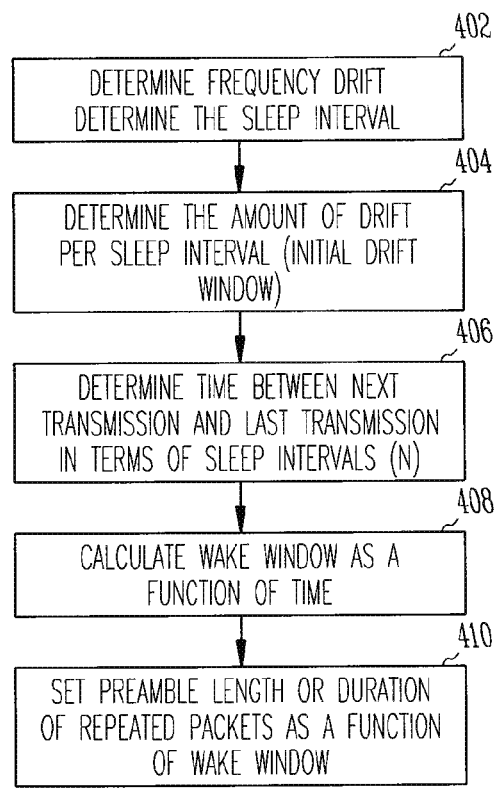
FIG. 4 shows a method for establishing the preamble length or duration of packet repetition according to one embodiment of the present subject matter.

FIG. 4 shows a method for establishing the preamble length according to one embodiment of the present subject matter. It is understood that in various embodiments the preamble length is the duration of time in which the transmission includes similar packets repeated more or less continuously. The frequency drift and the sleep interval are determined (402) and an initial drift window is generated (404). One way to determine the drift window is by the equation:

Initial drift window=sleep interval (seconds)*clock accuracy (microseconds/seconds) where the clock accuracy is usually specified in parts per million (which is equivalent to microseconds per seconds).

In one approach, the difference in time between the last transmission and the next transmission is divided by the sleep window interval to determine the number of sleep window intervals between transmissions, N (406). That number (N) is multiplied by the initial drift window to get the drift window adjusted for the time since the last transmission, also called the wake window (408). A transmitter transmitting a preamble or repeated packet transmissions that is as long as the time adjusted drift window or wake window, can be detected by the receiver even if the maximum amount of drift is encountered (410).

Alternate methods for determining the wake window include tracking the time interval since the last synchronization of clocks and the next planned transmission, and multiplying that interval by the frequency drift percentage to determine the wake window. The preamble used in a transmission is then at most the duration of the wake window.

Other embodiments provide synchronization each time a successful reception occurs, thus the wake window is calculated based on the time interval between a successful reception and the next planned transmission.

In various embodiments, it is possible that the frequency drift percentage of one clock is different than the frequency drift percentage of the other clock in the system. In such embodiments, the wake window calculation may use the sum of the two frequency drift percentages to determine a wake window that is large enough to accommodate the worst-case skew between clocks.

In various embodiments, the present system is also adaptable to reduce the power consumption of a wireless hearing instrument in the face of interference. Since much of the information for control and synchronization is asynchronous and very intermittent, it is desirable to build a system that does not necessarily communicate at a high duty cycle or even on regularly scheduled intervals since most of the time there is no information to share. This puts the onus on the transmitter or the device that has new information to be responsible for waking up the other device. For this system the receivers will wake up on regular intervals subject to the amount of latency allowed by the system. That may be on the order of a few hundred milliseconds. The transmitting device which has new information to share has the responsibility of getting the attention of the receiver in the aid(s) that are in a sleep/wake cycle (the time between wake intervals). We have referred to this in our system as fitful hibernation in which the receivers are asleep for 250 milliseconds and awaken only long enough to see if an RF preamble signal is available which may signal the arrival of a forthcoming information packet. In various embodiments where the packet is repeated continuously, the receiver can go to sleep after no more than two packet intervals. If no energy is found on the channel the radio will go back to sleep for another period of hibernation. This process may take only a millisecond or two to activate the receiver and lock it on frequency and check for potential signals. Thus the duty cycle can be less than 1 percent. In order to contact a receiver in fitful hibernation, a transmitter must send out a signal such as a preamble long enough to hit the wake window of the hibernating receiver. To guarantee a hit, the preamble must be slightly longer than the sleep interval of 250 milliseconds. This preamble is followed then by the message or packet containing the information to convey to the receiving device. In various embodiments the duration of packet repetition must be slightly longer than the sleep interval or 250 milliseconds. The receiving device may choose to acknowledge the transmission by sending an acknowledgement of response to the transmitting device. It is understood that in various embodiments different interval durations are used. Variations in order and communications may occur without departing from the scope of the present subject matter.

A problem arises however if the receiver wakes up from hibernation only to find an interferer on the channel. It has to wait to see if there is useful information for up to >250 mS but not much longer (<5 ms) since a true packet would be recognized at the end of this preamble due to synchronization patterns contained therein. If no synchronization information is received the receiver can assume that something is interfering with this channel. If that is the case the device can move to an agreed upon alternate channel and go back into a fitful hibernation mode. One or more alternate channels can be programmed into the devices.

Likewise, the transmitter, if is equipped with a receiver, can send a packet and if it does not receive an acknowledgement can also move to one of the agreed upon alternate channel(s) and resend the information there. It can also use a listen before talk scheme to determine if the channel is being interfered with and move as well.

In order to lower the power and minimize the latency of the system it is possible for the transmitter and receiver to maintain a loose synchronization by resynchronizing the sleep period or sleep interval of the receiver and transmitter and the transmission times of the initiating node. Each of the radios contain an oscillator that shall maintain a frequency drift on the order of 20 ppm to allow synchronization to be maintained. The drift rate with such an error is 20 uS/second. This would allow the power consumption of the transmitter and receiver to be reduced significantly for up to one and a half hours without further communication. The following table illustrates the latency reduction based on time from last transmission:

| | Time between transmissions (minutes) | | | | |
|---|---|---|---|---|---|
| | 1 | 10 | 30 | 60 | 120 |
| Latency (milliseconds) | 1.2 | 12 | 36 | 72 | 144 |

Notice that the latency reduction is reduced as time between transmissions increases. However the latency has an upper bound of the 250 mS or the chosen sleep time of the receiver. Note that not only is the latency reduced but the transmit power consumption is also reduced since the preamble time can be reduced by the latencies shown in the table owing to the fact that the transmitter has less uncertainty on when the receiver window is available on the sleeping device. Receive power consumption is also reduced since the receiver will be waiting for a significantly shorter preamble and will thus be able to complete the necessary communication in much less time.

Two benefits for using this approach include, but are not limited to, overall power consumption reduction, and interference avoidance. The first benefit is apparent since power consumed by the receiver is reduced to less than 1% of the total power required by a receiver that is permanently enabled. The cost, however, of such an approach is an increase in system latency. The second benefit prevents an interferer from both interfering with desired communication and from causing the receiver to remain awake in an active receive state continuously due to the presence of interfering energy on the channel.

As an alternative it is possible to design a unique preamble that could lower the time a receiver spends on a channel covered by interference such that preamble recognition could take place in much less time than having to wait for a data packet at the end of a long preamble. In various embodiments multiple packets are sent in succession such that the receiver would have to only remain awake briefly to determine if it can receive a packet or if the energy on the channel is merely due to interference in which case in some embodiments it can change to another agreed upon channel and go to sleep.

Transmitters that are not equipped with receivers such as the case of low cost remote control devices can simply send the information on all possible alternate channels. In this case, the hearing instrument would indicate through an audible tone to the user that the remote command has been successfully received.

It is understood that the present approach can be used in a hearing assistance device, or in components communicating with the hearing assistance device, e.g. a remote control device.

Figure 5:
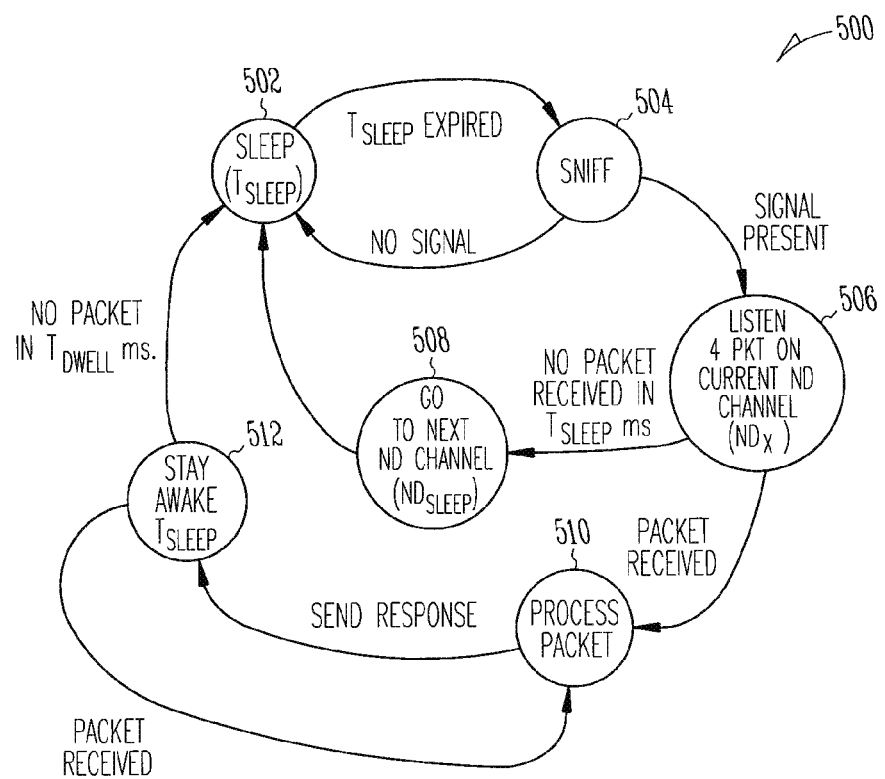
FIG. 5 shows a state diagram of a receiver employing a sleep interval and an alternate channel, according to one embodiment of the present subject matter.

FIG. 5 shows a state diagram of a receiver employing a sleep interval and an alternate channel, according to one embodiment of the present subject matter. It is understood that the exact order, states, and flow of a receiver may vary without departing from the scope of the present subject matter and that the state diagram in FIG. 5 is shown to demonstrate the present subject matter. The receiver has a timer Tsleep that counts during the sleep interval (502) and wakes to sniff packets at a first channel on the next sleep interval (504). If a signal is not detected, it goes back to sleep (502) until the next sleep interval. If a signal is detected it listens for a packet on that first channel (506). If a packet is detected then the packet is received (510) and the system will continue to receive packets transmitted according to the protocol (512, 510) and then return to the sleep state (502) to repeat the cycle after the next sleep interval. If no packet is detected (at 506) on that channel, it then goes to another channel (508) and then waits for another sleep interval (502). The sniffing process repeats on the new channel for the next sniff cycle.

In various embodiments, a predetermined time for receiving a packet preamble is used at state 506 to test whether the received signal is a packet or whether it is interference. In various embodiments, a predetermined time between packets is used to detect whether additional packets are sent at state 512 to receive multiple packets. In various embodiments a protocol is used, such as the protocol described in U.S. Patent Application Publication 2006/0274747, entitled: COMMUNICATION SYSTEM FOR WIRELESS AUDIO DEVICES, and PCT Application Publication WO 2006/133158, titled: COMMUNICATION SYSTEM FOR WIRELESS AUDIO DEVICES, which are both hereby incorporated by reference in their entirety. In various embodiments, a protocol is used such as the protocol in U.S. Pat. No. 7,529,565, which is hereby incorporated by reference in its entirety. Other protocols may be used without departing from the scope of the present subject matter.

Figure 6:
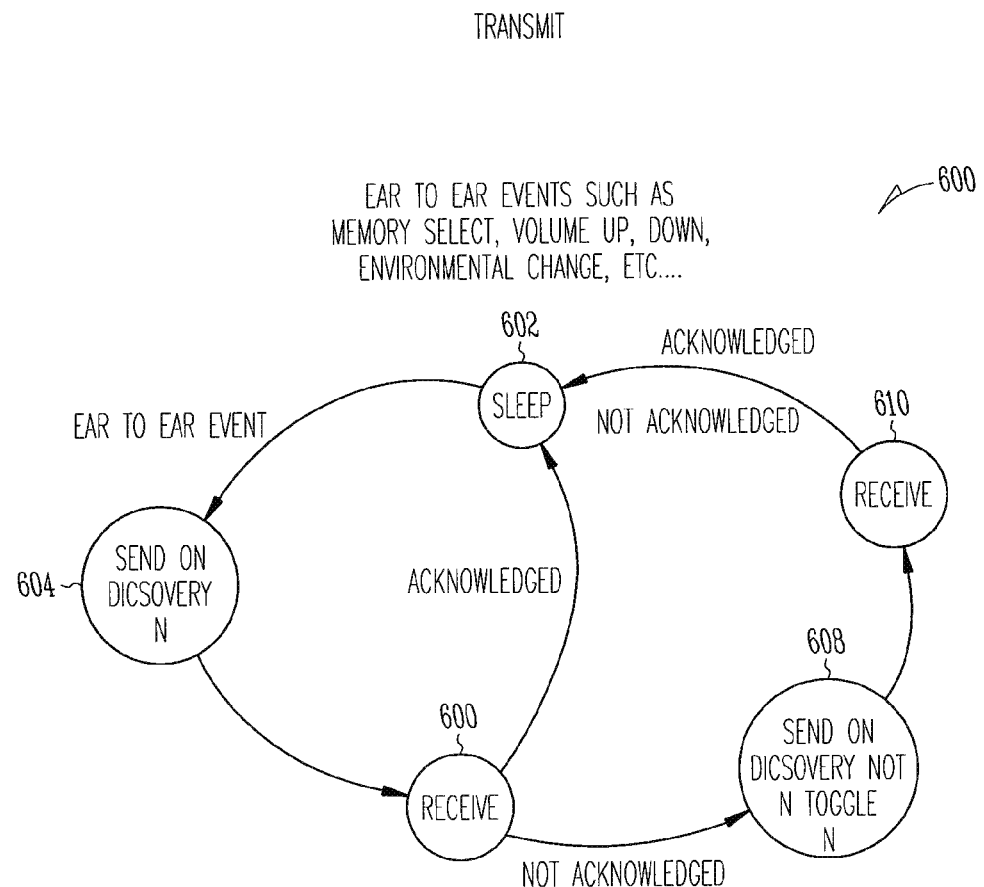
FIG. 6 shows a state diagram for ear-to-ear communications, according to various embodiments of the present subject matter.

FIG. 6 shows a state diagram for ear-to-ear communications, according to various embodiments of the present subject matter. It is understood that the exact order, states, and flow of a receiver may vary without departing from the scope of the present subject matter and that the state diagram in FIG. 6 is shown to demonstrate the present subject matter. The state diagram 600 is adapted to exit a sleep state (602) upon a need to communicate an ear-to-ear event, including, but not limited to memory select, volume up, volume down, and environmental change. This invokes a transmission (604) of the information by a hearing assistance device at one ear which is received by a receiver at the other hearing assistance device on the other ear (606). If reception is acknowledged, the transmitter at the first ear can go back into a sleep state (602). If not, then the information is re-sent (608) until it is received (610) with acknowledgment or until a timer of transmissions determines that no successful receptions were made over a number of transmission attempts (N), resulting from no acknowledgements over N attempts. The transmitter then returns to the sleep state (602).

Figure 7:
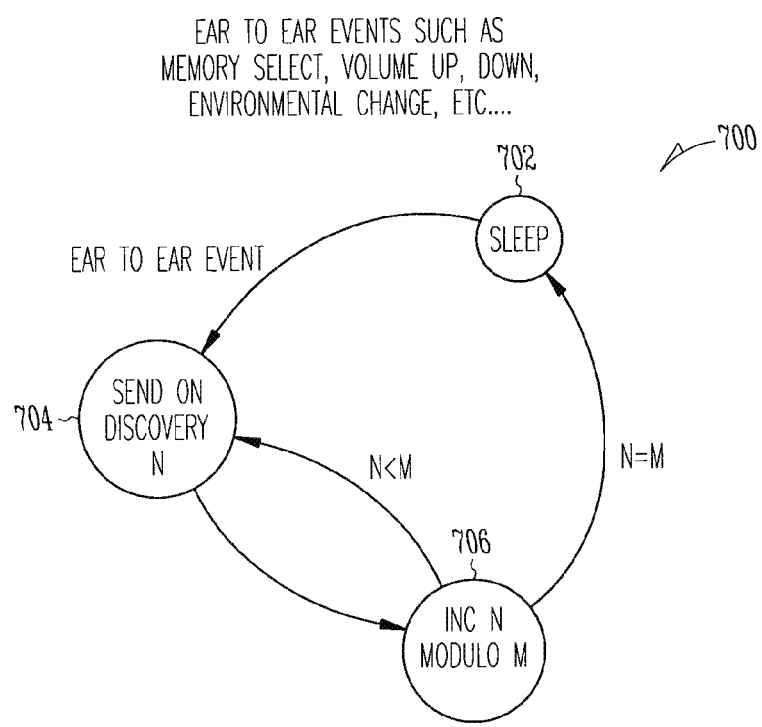
FIG. 7 shows a state diagram of one embodiment of the present subject matter where an ear-to-ear event is transmitted without a receiver acknowledgement capability.

FIG. 7 shows a state diagram of one embodiment of the present subject matter where an ear-to-ear event is transmitted without a receiver acknowledgement capability. It is understood that the exact order, states, and flow of a receiver may vary without departing from the scope of the present subject matter and that the state diagram in FIG. 7 is shown to demonstrate the present subject matter. The state diagram 700 is adapted to exit a sleep state (702) upon a need to communicate an ear-to-ear event, including, but not limited to memory select, volume up, volume down, and environmental change. This invokes a transmission of the information by a hearing assistance device at one ear for reception by a receiver at the other hearing assistance device on the other ear (704). The information is re-sent (706) a number of times (N) until a timer of transmissions determines that a number of transmission attempts (M) were made. The transmitter then returns to the sleep state (702). The assumption in such systems is that the receiver ultimately receives the information over several attempts.

In various embodiments, rather than using a preamble at least as long as the wake interval, the transmitter is programmed to use a shorter preamble, but to repeat the transmission at least for the duration of the wake interval so as to ensure that the transmission is detected despite the skew of the clocks of the system. In such embodiments, the packets will be encoded with the same sequence bits so that multiple receptions of the same packet are treated as redundant and used only once.

The foregoing examples demonstrate the present subject matter in adjustments of a preamble length transmitted by the transmitter based on the frequency drift of the clocks in the system. It is understood that the system can instead employ an adjustable reception window based on the frequency drift of the clocks in the system. In other embodiments, it is possible to adjust both the transmitted preamble length or the number of repeated packets and the reception window based on the frequency drift of the clocks in the system to provide reliable communications. Thus, the present subject matter is not limited to adjustment of preamble length transmitted by the transmitter. Such a system can be used to reduce the overall skew of the clocks over time, which provides embodiments with reduced preamble lengths and reduced receiver wake periods to conserve energy consumed in communications.

It is understood that variations in communications protocols, antenna configurations, and combinations of components may be employed without departing from the scope of the present subject matter. Variation in power levels, channel selection, diversity antenna configurations, and encoding algorithms are possible without departing from the scope of the present subject matter. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

The present subject matter can be used for a variety of hearing assistance devices, including but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. Such devices are also known as receiver-in-the-canal (RIC) or receiver-in-the-ear (RITE) hearing instruments. It is understood that other hearing assistance devices not expressly stated herein may fall within the scope of the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system, comprising:
    a first hearing assistance device configured to be worn by a wearer, the first hearing assistance device including:
    a receiver including a first clock having a first frequency drift, the receiver configured to receive on sleep intervals using the first clock as a timer; and
    a second hearing assistance device configured to be worn by the wearer, the second hearing assistance device including:
    a transmitter including a second clock having a second frequency drift, the transmitter configured to transmit at a time which is a multiple of the sleep intervals using the second clock as a timer, wherein the transmitter is configured to transmit a repetition of packets having a length that increases with a time between transmissions based on one or more of the first and second frequency drifts, the length selected to ensure detection of the packets by the receiver regardless of drift of the first and second clocks.

2. The system of claim 1, wherein the transmitter is configured to transmit the repetition of packets for a duration that increases with a time between successful resynchronization events.

3. The system of claim 2, wherein the duration is based on one of a first and second clock frequency drift percentages.

4. The system of claim 2, wherein the duration is selected to ensure detection of the packet by the receiver regardless of drift of the first and second clocks.

5. The system of claim 1, wherein the repetition of packets contains a sequence number to prevent the receiver from acting multiple times on data contained in a packet of the repetition of packets.

6. The system of claim 1, wherein the receiver is adapted to change channel of reception when signals are received but a packet is not detected.

7. The system of claim 1, wherein at least one of the first hearing assistance device and the second hearing assistance device include a hearing aid.

8. The system of claim 7, wherein the hearing aid includes a behind-the-ear (BTE) hearing aid.

9. The system of claim 7, wherein the hearing aid includes an in-the-ear (ITE) hearing aid.

10. The system of claim 7, wherein the hearing aid includes an in-the-canal (ITC) hearing aid.

11. The system of claim 7, wherein the hearing aid includes a completely-in-the-canal (CIC) hearing aid.

12. The system of claim 7, wherein the hearing aid includes a receiver-in-the-canal (RIC) hearing aid.

13. The system of claim 7, wherein the hearing aid includes a receiver-in-the-ear (RITE) hearing aid.

14. A method, comprising:
    synchronizing a first clock of a transmitter of a first hearing assistance device configured to be worn in a first ear of a wearer with a second clock of a receiver of a second hearing assistance device configured to be worn in a second ear of the wearer at a synchronization time;
    determining a time interval between the synchronization time and a transmission time of a transmission;
    calculating a drift window using a potential drift amount between the first clock and the second clock over the time interval;
    transmitting the transmission with the transmitter, the transmission including a repetition of packets having a duration based on the drift window; and
    receiving with the receiver at a plurality of predetermined sleep intervals by activating the receiver for a duration of time of at least the drift window at each sleep interval to determine if a signal is present.

15. The method of claim 14, wherein at least one of the first hearing assistance device and the second hearing assistance device include a hearing aid.

16. The method of claim 14, comprising: if a signal is present and not recognized in a predetermined time, then changing to a new receive channel.

17. The method of claim 14, wherein the transmission includes a repetition of packets that is approximately continuous.

18. The method of claim 17, comprising: if a signal is present, then receiving packets with the receiver until no packets are received for a predetermined time.

19. The method of claim 14, wherein the transmitter sends the repetition of packets upon detection of an event, the repetition of packets including a duration related to the drift window.

20. The method of claim 14, wherein the first clock and the second clock are synchronized upon a successful receipt of the transmission.

* * * * *